United States Patent
Ang et al.

(10) Patent No.: US 11,558,885 B2
(45) Date of Patent: Jan. 17, 2023

(54) SIMULTANEOUS BANDWIDTH PART (BWP) SWITCH ON MULTIPLE CELLS

(71) Applicant: QUALCOMM Incorporated, San Diego, CA (US)

(72) Inventors: Peter Pui Lok Ang, San Diego, CA (US); Huilin Xu, Temecula, CA (US); Heechoon Lee, San Diego, CA (US); Awlok Singh Josan, San Francisco, CA (US); Wooseok Nam, San Diego, CA (US); Changhwan Park, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 104 days.

(21) Appl. No.: 17/236,943

(22) Filed: Apr. 21, 2021

(65) Prior Publication Data

US 2021/0337567 A1  Oct. 28, 2021

Related U.S. Application Data

(60) Provisional application No. 63/014,055, filed on Apr. 22, 2020.

(51) Int. Cl.
*H04W 72/12* (2009.01)
*H04W 72/00* (2009.01)
*H04W 72/04* (2009.01)

(52) U.S. Cl.
CPC ... *H04W 72/1268* (2013.01); *H04W 72/0453* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 2014/0057644 A1* | 2/2014 | Chetlur | H04L 5/0085 |
| | | | 455/452.2 |
| 2014/0192662 A1* | 7/2014 | Chetlur | H04W 72/1252 |
| | | | 370/252 |
| 2019/0253531 A1* | 8/2019 | Basu Mallick | H04L 69/22 |
| 2020/0177341 A1* | 6/2020 | Li | H04L 5/0053 |
| 2020/0383149 A1* | 12/2020 | Rico Alvarino | H04W 76/11 |
| 2022/0095258 A1* | 3/2022 | Yeo | H04W 72/042 |

* cited by examiner

*Primary Examiner* — Sai Aung
(74) *Attorney, Agent, or Firm* — Loza & Loza, LLP

(57) ABSTRACT

A wireless communication network includes a user equipment (UE) to receive a set of instructions, from a base station, to perform a simultaneous change of a set of current bandwidth parts (BWPs) to a set of new BWPs in a set of cells. The set of instructions schedules set of slots for the UE to receive and/or transmit a set of downlink and/or uplink signals via the set of new BWPs, respectively. The UE also determines a delay associated with performing the simultaneous change of the set of current BWPs to the set of new BWPs, respectively, and determines whether it is able to receive and/or transmit the set of downlink and/or uplink signals via the set of new BWPs in the set of slots satisfying the delay, respectively. A base station is also included to communicate with the UE to effectuate the aforementioned operation.

29 Claims, 14 Drawing Sheets

| SCS INDEX | SLOT LENGTH (ms) | $T_{BWPSwitchDelay}$ (slots) | |
|---|---|---|---|
| | | UE Type 1 | UE Type 2 |
| 0 | 1 | 1 | 3 |
| 1 | 0.5 | 2 | 5 |
| 2 | 0.25 | 3 | 9 |
| 3 | 0.125 | 6 | 18 |

| TIME DOMAIN RESOURCE ALLOCATION | | | |
|---|---|---|---|
| INDEX | K0 (or k2) | SLIV | DMRS |
| 0 | $K0 \text{ (or } k2)_0$ | $SLIV_0$ | 1 or 2 |
| ⋮ | | | |
| m | $K0 \text{ (or } k2)_m$ | $SLIV_m$ | 1 or 2 |

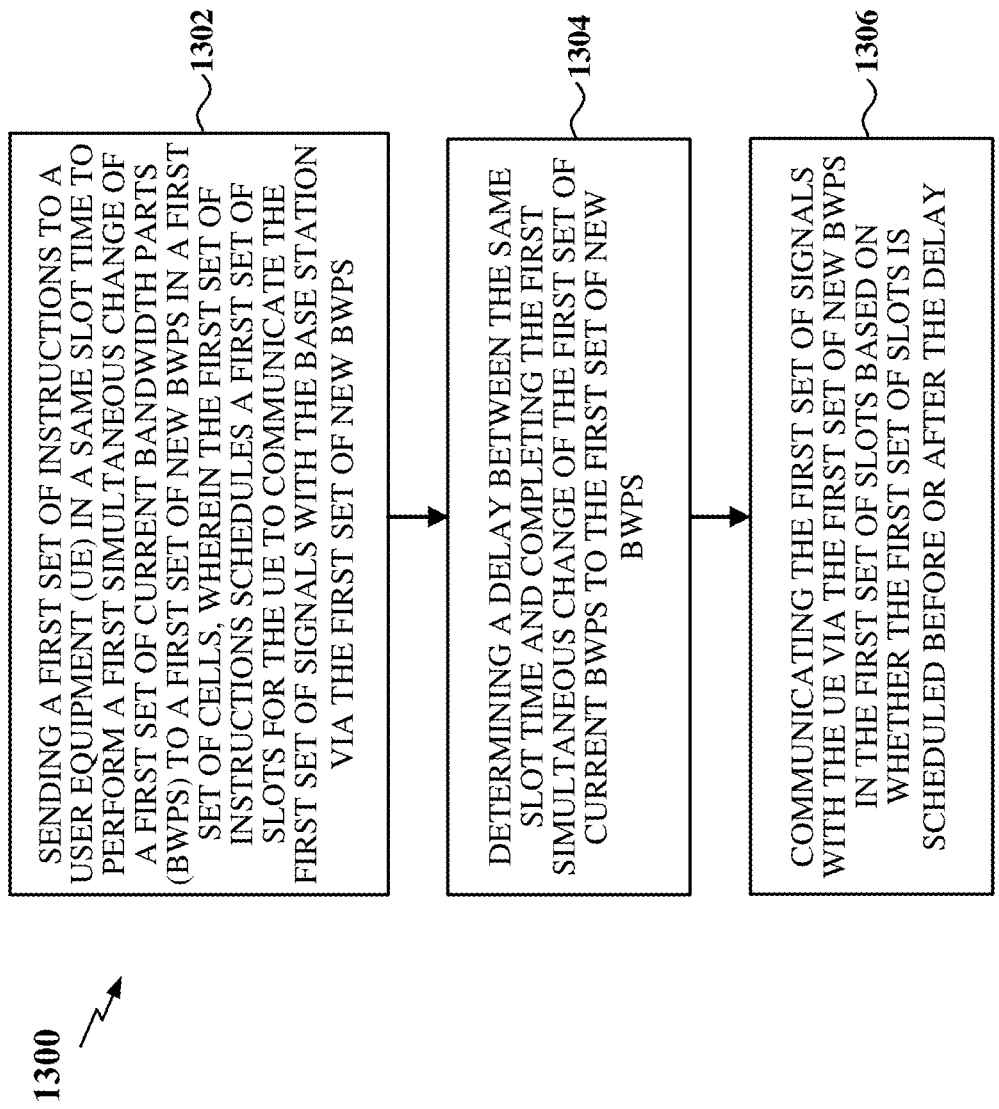

SIMULTANEOUS BANDWIDTH PART (BWP) SWITCH ON MULTIPLE CELLS

CROSS-REFERENCE TO RELATED APPLICATION

This application claims the benefit of the filing date of U.S. Provisional Application Ser. No. 63/014,055, filed on Apr. 22, 2020, which is incorporated herein by reference.

TECHNICAL FIELD

The technology discussed below relates generally to wireless communication systems or networks, and more particularly, to a wireless communication network including a user equipment (UE) configured to perform simultaneous bandwidth part (BWP) switch on multiple cells and a base station configured to control the UE performing the simultaneous BWP switch on multiple cells.

INTRODUCTION

In many existing wireless communication systems, a cellular network is implemented by enabling wireless user equipment (UEs) to communicate with one another through signaling with a nearby base station. A base station may support a set of cells using different carriers, which UEs may use to communicate. Each cell may support a set of bandwidth parts (BWPs), where one of the set of BWPs may be active at a given time for reception of downlink signals from or transmissions of uplink signals to a base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

An example provides a user equipment (UE). The UE includes a processor, a wireless transceiver communicatively coupled to the processor, and a memory communicatively coupled to the processor. The processor and the memory are configured to receive a set of instructions from a base station in a same slot time, using the wireless transceiver, to perform a simultaneous change of a set of current bandwidth parts (BWPs) to a set of new BWPs in a first set of cells, wherein the set of instructions schedules a first set of slots for the UE to communicate a first set of signals with the base station via the set of new BWPs; determine a delay between the same slot time and completing the simultaneous change of the set of current BWPs to the set of new BWPs; and communicate the first set of signals with the base station via the set of new BWPs in the first set of slots based on whether the first set of slots is scheduled before or after the delay.

Another example provides a method for wireless communication at a user equipment (UE). The method includes receiving a set of instructions from a base station in a same slot time to perform a simultaneous change of a set of current bandwidth parts (BWPs) to a set of new BWPs in a first set of cells. The set of instructions schedules a first set of slots for the UE to communicate a first set of signals with the base station via the set of new BWPs. The method further includes determining a delay between the same slot time and completing the simultaneous change of the set of current BWPs to the set of new BWPs; and communicating the first set of signals with the base station via the set of new BWPs in the first set of slots based on whether the first set of slots is scheduled before or after the delay.

An example provides a user equipment (UE). The UE includes means for receiving a set of instructions from a base station in a same slot time to perform a simultaneous change of a set of current bandwidth parts (BWPs) to a set of new BWPs in a first set of cells. The set of instructions schedules a first set of slots for the UE to communicate a first set of signals with the base station via the set of new BWPs. The UE further includes means for determining a delay between the same slot time and completing the simultaneous change of the set of current BWPs to the set of new BWPs; and means for communicating the first set of signals with the base station via the set of new BWPs in the first set of slots based on whether the first set of slots is scheduled before or after the delay.

Another example provides a non-transitory computer-readable medium storing computer-executable code, comprising code for causing a computer in a user equipment (UE) to receive a set of instructions from a base station in a same slot time to perform a simultaneous change of a set of current bandwidth parts (BWPs) to a set of new BWPs in a first set of cells. The set of instructions schedules a first set of slots for the UE to communicate the first set of signals with the base station via the set of new BWPs. The code causing the computer to further determine a delay between the same slot time and completing the simultaneous change of the set of current BWPs to the set of new BWPs; and communicate the first set of signals with the base station via the set of new BWPs in the first set of slots based on whether the first set of slots is scheduled before or after the delay.

Another example provides a base station. The base station includes a processor, a wireless transceiver communicatively coupled to the processor, and a memory communicatively coupled to the processor. The processor and the memory are configured to send a first set of instructions to a user equipment (UE) in a same slot time to perform a first simultaneous change of a first set of current bandwidth parts (BWPs) to a first set of new BWPs in a first set of cells. The first set of instructions schedules a first set of slots for the UE to communicate a first set of signals with the base station via the first set of new BWPs. The processor and the memory are further configured to determine a delay between the same slot time and completing the first simultaneous change of the first set of current BWPs to the first set of new BWPs by the UE, and communicate the first set of signals with the UE via the first set of new BWPs in the first set of slots using the wireless transceiver based on whether the first set of slots is scheduled before or after the delay.

Another example provides a method for wireless communication at a base station. The method includes sending a first set of instructions to a user equipment (UE) in a same slot time to perform a first simultaneous change of a first set of current bandwidth parts (BWPs) to a first set of new BWPs in a first set of cells. The first set of instructions schedules a first set of slots for the UE to communicate a first set of signals with the base station via the first set of new BWPs. The method further includes determining a delay between the same slot time and completing the first simultaneous change of the first set of current BWPs to the first set of new BWPs by the UE, and communicating the first set of signals with the UE via the first set of new BWPs in the first set of slots based on whether the first set of slots is scheduled before or after the delay.

Another example provides a base station. The base station includes means for sending a first set of instructions to a user equipment (UE) in a same slot time to perform a first simultaneous change of a first set of current bandwidth parts (BWPs) to a first set of new BWPs in a first set of cells. The first set of instructions schedules a first set of slots for the UE to communicate a first set of signals with the base station via the first set of new BWPs. The base station further includes means for determining a delay between the same slot time and completing the first simultaneous change of the first set of current BWPs to the first set of new BWPs by the UE; and means for communicating the first set of signals with the UE via the first set of new BWPs in the first set of slots based on whether the first set of slots is scheduled before or after the delay.

Another example provides a non-transitory computer-readable medium storing computer-executable code, comprising code for causing a computer in a base station to send a first set of instructions to a user equipment (UE) in a same slot time to perform a first simultaneous change of a first set of current bandwidth parts (BWPs) to a first set of new BWPs in a first set of cells. The first set of instructions schedules a first set of slots for the UE to communicate a first set of signals with the base station via the first set of new BWPs. The code further causing the computer to determine a delay between the same slot time and completing the first simultaneous change of the first set of current BWPs to the first set of new BWPs by the UE; and communicate the first set of signals with the UE via the first set of new BWPs in the first set of slots using the wireless transceiver based on whether the first set of slots is scheduled before or after the delay.

These and other aspects of the invention will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

BRIEF DESCRIPTION OF THE DRAWINGS

FIG. 13 is a flow diagram of an exemplary method, implemented in a base station, for controlling simultaneous bandwidth part (BWP) switches across a set of cells by a user equipment (UE) according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
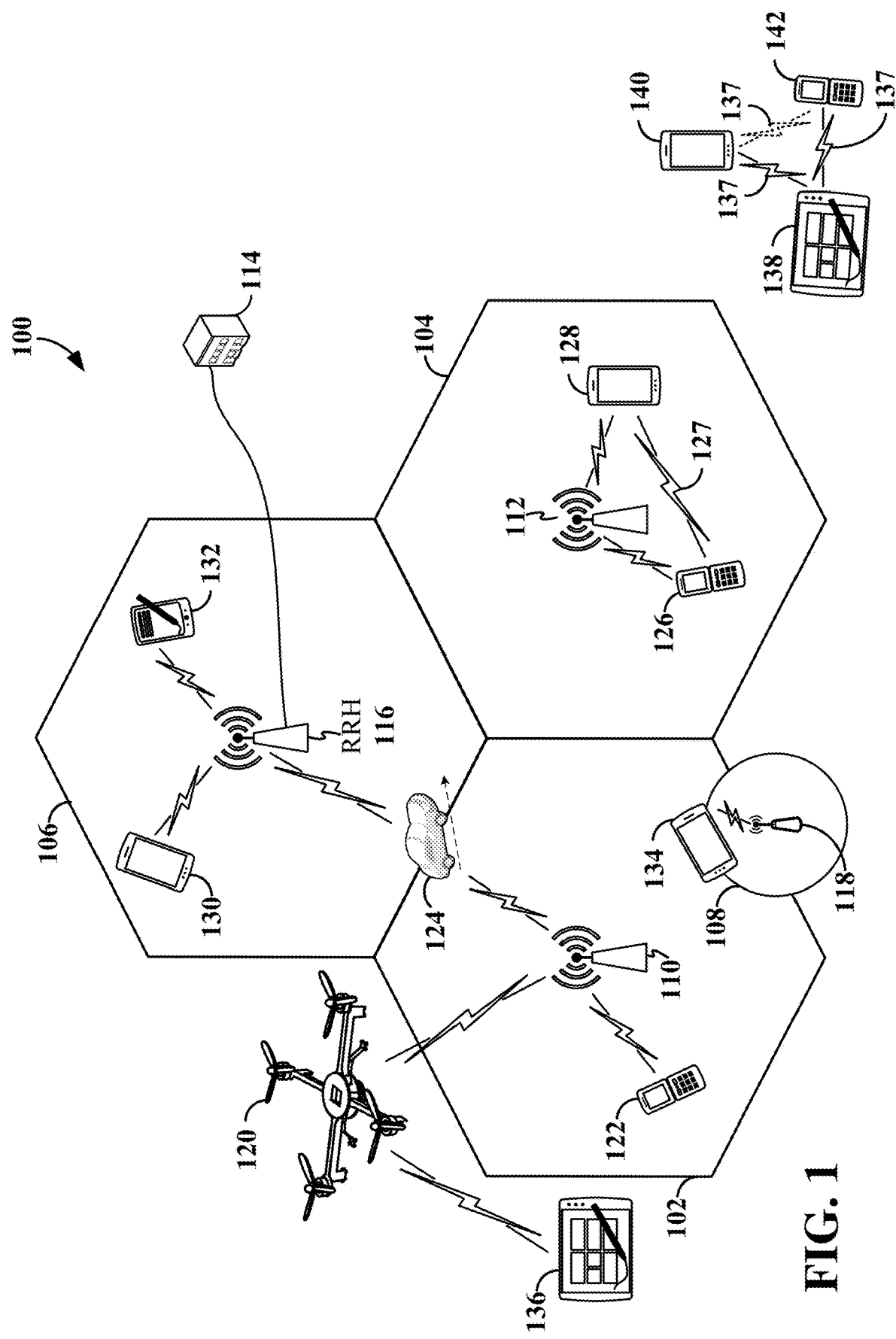
FIG. 1 is a diagram illustrating an example of a wireless radio access network according to some aspects.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier TDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (I-DMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Any of the UEs (e.g., 122, 124, 126, etc.) described in FIG. 1 may be simultaneously communicating with a set of cells (different carriers) provided by a base station via a current set of active bandwidth parts (BWPs), respectively. In some situations, the base station may send a set of instructions to the UE in the same time slot (e.g., time aligned or overlapping time slots) to perform a simultaneously change of the current set of active BWPs to a new set of active BWPs; the set of instructions also scheduling downlink reception and/or uplink transmission in a subsequent (new) set of time slots. The UE and/or the base station has to determine a delay between the time or slot in which the set of instructions are sent and the UE completing the simultaneously change of the current set of active BWPs to the new set of active BWPs.

If the subsequent set of time slots are scheduled after the delay, the UE performs the simultaneous change of the current set of active BWPs to the new set of active BWPs, and then performs the scheduled downlink receptions and/or transmissions via the new set of active BWPs in the set of time slots. If any of the subsequent set of time slots is/are scheduled before the delay, then the UE and/or base station may take certain actions in accordance with the current disclosure as described herein. For example, one action would be for the UE to perform the change to the new set of active BWPs, but not expected to receive and/or transmit the downlink and/or uplink signal in the scheduled one or more time slots. Another action would be for the UE and/or the base station to adjusts the scheduled set of time slots such that the adjusted set of time slots are scheduled after the delay. Still another action would be for the UE and/or the base station to perform the simultaneous change of the active BWPs in multiple phases such that the delay associated with the subset is smaller, and time slots associated with the subset are scheduled after the subset delay.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
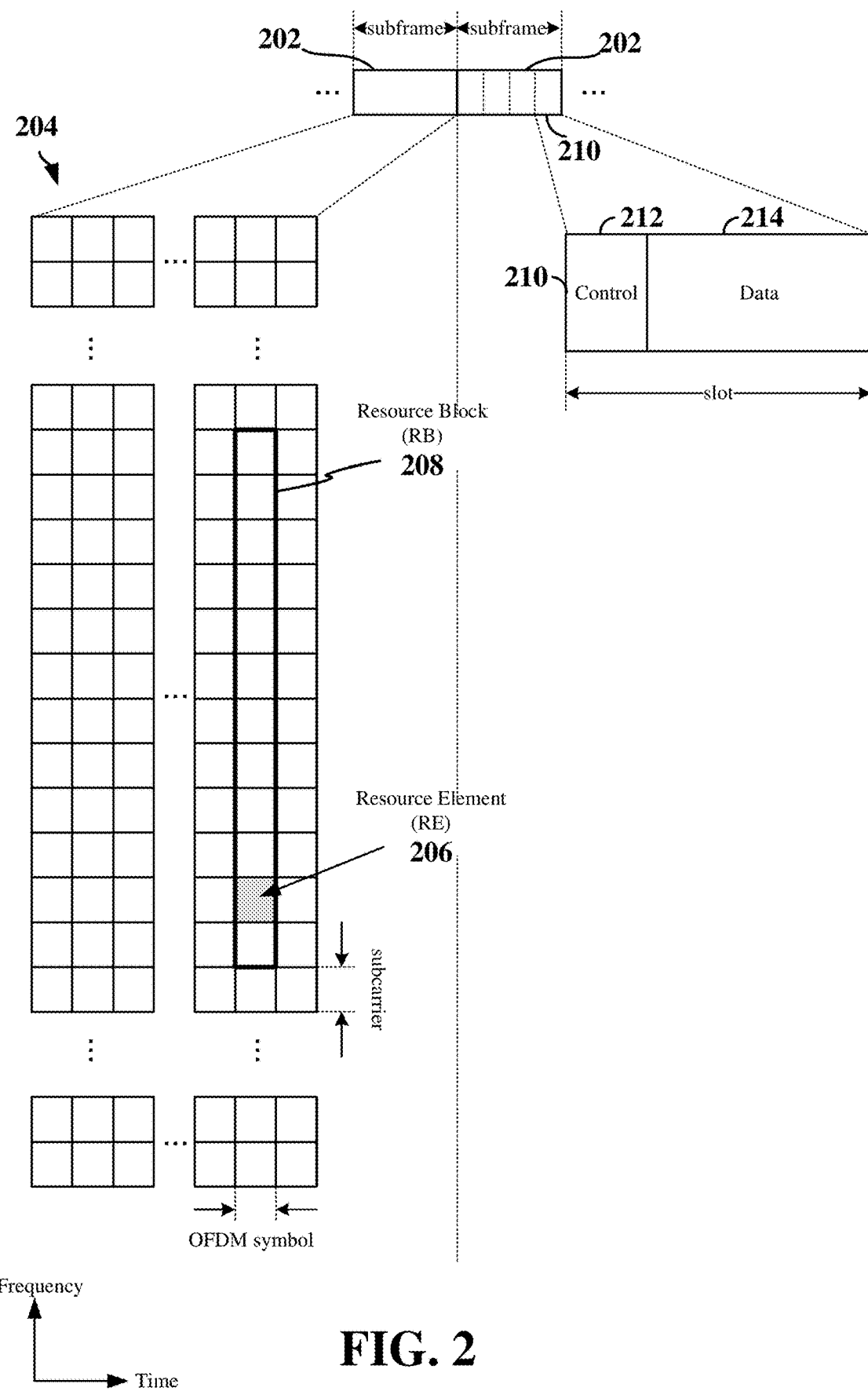
FIG. 2 is a schematic diagram illustrating organization of wireless communication link resources in an air interface utilizing orthogonal frequency divisional multiplexing (OFDM) according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

The slot 210 mentioned above is an example of one slot among a set of time slots where a UE may receive a set of instructions from a base station to perform a simultaneously change from a current set of active BWPs to a new set of active BWPs. Each of the set of instructions may be a DCI situated in the control portion 212 (e.g., PDCCH) of the slot 210. The slot 210 may also be an example of a slot scheduled by one of the set of instructions for downlink reception or uplink transmission. Such downlink reception or uplink transmission may occur in the data portion 214 (e.g., PDSCH or PUSCH) of the slot 210.

Figures 3, 4:
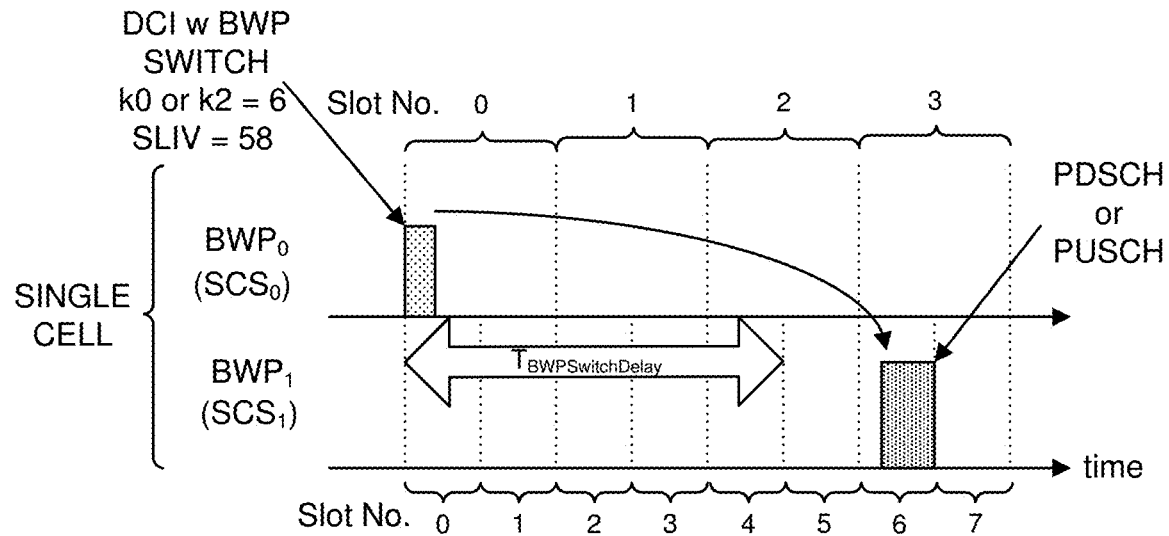
FIG. 3 illustrates a timing diagram of an example single-cell bandwidth part (BWP) switch operation performed by a user equipment (UE) according to some aspects.
FIG. 4 illustrates a table indicating various examples of a delay $T_{BWPSwitchDelay}$ for performing a bandwidth part (BWP) switch in a single-cell according to some aspects.

FIG. 3 illustrates a timing diagram of an example single-cell bandwidth part (BWP) switch operation performed by a user equipment (UE) according to some aspects. The UE may have a set of preconfigured BWPs in a single cell or carrier, wherein one of the set of preconfigured BWPs is active at one time. An active BWP means that a base station may schedule downlink transmission via a PDSCH or uplink transmission via a PUSCH in the active BWP (depending on whether the active BWP is for downlink or uplink transmission). The remaining preconfigured BWPs at such time are inactive.

Each of the BWPs in the set of preconfigured BWPs may have different parameters. As another example, two or more of the BWPs may have different frequency bandwidths. Two or more of the BWPs may have different subcarrier spacings (SCSs). The active BWP may have parameters that may be more useful at such time for a UE to receive downlink (DL) transmissions from or transmit uplink (UL) transmissions to a base station. For example, if the overall traffic in the cell is relatively low, it may be more power efficient for the UE to operate using a BWP with a smaller bandwidth. Or, if the traffic in a particular BWP is relatively high, it may be useful for the UE to use a different BWP to receive DL transmissions or transmit UL transmissions from or to the base station.

With reference again to FIG. 3, when a base station is configured to have a UE perform DL reception or UL transmission in a BWP different than the active BWP, the base station sends a downlink control information (DCI) message in a PDCCH to the UE in, for example, a slot (which is referred to herein as slot no. 0). In accordance with NR 5G, the DCI message may be configured in a 1_1 format indicating a BWP switch instruction for DL reception, and including a k0 parameter indicating a slot and a start and length indicator value (SLIV) indicating symbol intervals in which the UE is expected to receive a DL signal via a PDSCH. The k0 parameter identifies the slot using a slot offset (in the new BWP slot numerology) from the slot in which the DCI is received.

Thus, with reference to the example in FIG. 3, the DCI is received in slot 0 in the current or active $BWP_0$, which also corresponds to slot 0 in the new $BWP_1$, because the start of both slots 0 are logically time aligned. The k0 or slot offset indicated in the DCI is six (6) in the new BWP numerology. For instance, in this example, the new $BWP_1$ has an SCSI twice that of the $SCS_0$ of the current or active $BWP_0$. Thus, the length of each slot of the new $BWP_1$ is half that of the current or active $BWP_0$. The SLIV indicated in the DCI is 58, which is a code that indicates the start symbol interval (e.g., symbol interval 2) and the symbol interval length (e.g., 5 symbol intervals). In response to the DCI, the UE performs the BWP switch from the current $BWP_0$ to the new $BWP_1$ by the time of the indicated slot and symbol interval, and expects to receive a DL transmission via the PDSCH from the base station during such slot and symbol intervals, as illustrated.

For uplink transmission, in accordance with NR 5G, the DCI may be configured in a 0_1 format indicating a BWP switch instruction for UL transmission, and including a k2 parameter indicating a slot and a SLIV indicating symbol intervals in which the UE is expected to transmit a UL signal via a PUSCH. Similarly, the k2 parameter identifies the slot using a slot offset (in the new BWP slot numerology) from the slot in which the DCI is received. The SLIV specifies the symbol intervals within the slot (e.g., start symbol interval and length).

The wireless communication network 100 determines a delay $T_{BWPSwitchDelay}$ by which the UE is to perform the BWP switch in a single cell so that the UE is able to receive a DL signal or transmit a UL signal via the scheduled slot and symbol intervals. The delay $T_{BWPSwitchDelay}$ takes into account the time for the UE to decode the DCI, perform software configuration to set up for the new BWP, and perform radio frequency (RF) configuration to set up for the new BWP. The delay $T_{BWPSwitchDelay}$ may depend on the capability of the UE. A type 1 delay $T_{BWPSwitchDelay}$ is smaller than a type 2 $T_{BWPSwitchDelay}$, as indicated in the table depicted in FIG. 4. For example, a more capable UE (e.g., with type 1 delay $T_{BWPSwitchDelay}$ capability) may have a smaller delay $T_{BWPSwitchDelay}$ than that of a less capable UE (e.g., with type 2 $T_{BWPSwitchDelay}$ capability). The delay $T_{BWPSwitchDelay}$ may be specified in absolute time (e.g., milliseconds (ms)) or in number of slots (in the new BWP slot numerology) from the start of the same slot in which the DCI is received.

Thus, with reference to the example of FIG. 3, the delay $T_{BWPSwitchDelay}$ is indicated to be five (5) slots in the new $BWP_1$ slot numerology. If, for example, the new $BWP_1$ has an SCS of 30 kiloHertz (kHz), the length of each slot is 0.5 ms. Thus, the delay $T_{BWPSwitchDelay}$, being indicated as five (5) slots in the new $BWP_1$ slot numerology, may also be indicated in absolute time of 2.5 ms. If the k0 or k2 (e.g., 6) indicated in the DCI meets or exceeds the delay $T_{BWPSwitchDelay}$ (e.g., 5), the UE is able to perform the BWP switch and receive or transmit via the scheduled PDSCH or PUSCH interval, respectively. However, if the k0 or k2 (e.g., 4) indicated in the DCI does not meet or exceed the delay $T_{BWPSwitchDelay}$ (e.g., 5), the UE may ignore or not process the BWP switch instruction in the DCI as it is not capable of performing the BWP switch by the scheduled PDSCH or PUSCH interval.

FIG. 4 illustrates a table indicating various examples of the delay $T_{BWPSwitchDelay}$ for performing a bandwidth part (BWP) switch in a single-cell according to some aspects. The left column of the table specifies the SCS index. For example, SCS indices 0-3 indicate SCSs of 15 kHz, 30 kHz, 45 kHz, and 60 kHz, respectively. The second column from the left specifies the slot length in ms. For example, the slot lengths of SCS indices 0-3 are 1 ms, 0.5 ms, 0.25 ms, and 0.125 ms, respectively. The right column specifies the delay $T_{BWPSwitchDelay}$ for a type 1 UE shown in the left sub-column and type 2 UE shown in the right sub-column. For example, the delays $T_{BWPSwitchDelay}$ in slots for BWPs with SCS indices 0-3 for a type 1 UE are 1, 2, 3, and 6, respectively.

The delays $T_{BWPSwitchDelay}$ in slots for BWPs with SCS indices 0-3 for a type 2 UE are 3, 5, 9, and 18, respectively.

Figures 5, 6:
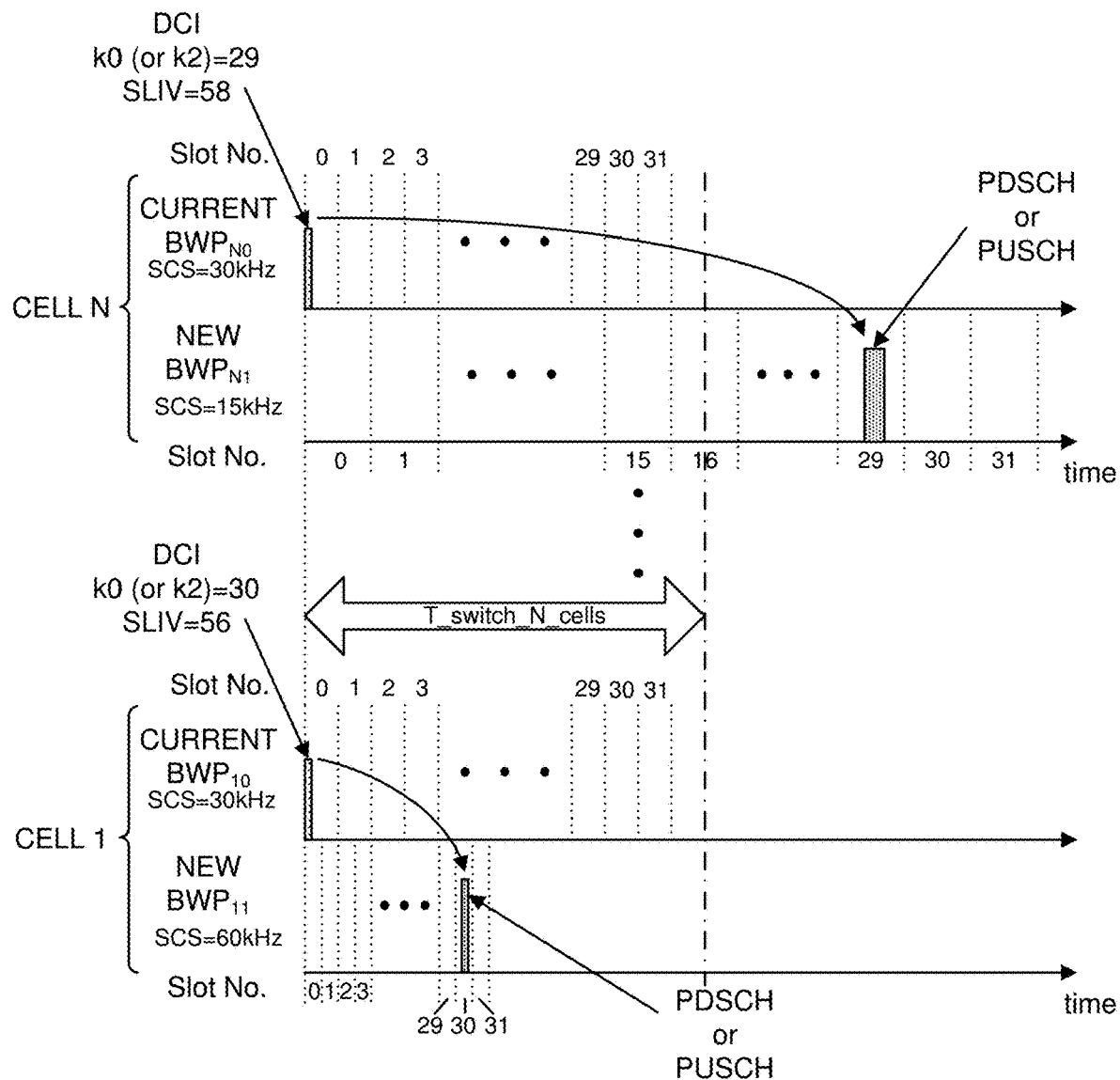
FIG. 5 illustrates a timing diagram of an example bandwidth part (BWP) switch operation across a set of cells performed by a user equipment (UE) according to some aspects.
FIG. 6 illustrates an example Time Domain Resource Allocation (TDRA) table according to some aspects.

FIG. 5 illustrates a timing diagram of an example bandwidth part (BWP) switch operation across a set of cells performed by a user equipment (UE) according to some aspects. The UE may have configured active BWPs across a set of N active cells or different carriers. Each cell may have a set of preconfigured BWPs, where one BWP is active in each cell at a given time. For example, the UE may be receiving DL signals or transmitting UL signals from or to a base station in cell 1 using a current or active $BWP_{10}$. The UE may be receiving DL signals or transmitting UL signals from or to the base station in cell N using a current or active $BWP_{N0}$.

In some situations, the base station may send a set of DCIs to the UE in the same slot 0 in the active $BWP_{10}$ to $BWP_{N0}$ in cells 1 through N. The set of DCIs provide a set of instructions for the UE to perform a simultaneous BWP switch from the set of active or current $BWP_{10}$ to $BWP_{N0}$ to a set of new $BWP_{11}$ to $BWP_{N1}$ in the cells 1 to N, respectively. Again, the same slot "0" is defined as having a logically aligned start time, although the slots may have different lengths. In this example, the DCI received in $BWP_{10}$ in cell 1 includes a k0 (or k2)=30 and an SLIV=56 (e.g., start interval 0 with length 5). The DCI received in $BWP_{N0}$ in cell N includes a k0 (or k2)=29 and an SLIV=58 (e.g., start interval 2 with length 5).

In this example, the delay $T_{BWPSwitchDelay}$ is not applicable because that time delay is for a single-cell BWP switch. The applicable time delay is T_switch_N_cells, which may be a network-configured delay to allow the UE to perform simultaneous BWP switch across N cells. The delay T_switch_N_cells may be given by the following equation:

$$T\_switch\_N\_cells = T_{BWPSwitchDelay} D^*([N/K]-1) \quad \text{Eq. 1}$$

where $T_{BWPSwitchDelay}$ is the delay for a single-cell BWP switch, D is an incremental delay for each additional simultaneous BWP switch (which may depend on the UE capability type (e.g., type 1 or type 2)), N is the number of cells over which the simultaneous BWP switch is to take place, and K is the number of simultaneous BWP switches that the UE is capable of processing in parallel. As can be seen, as the number of cells N over which the BWP switch is to take place increases, a larger delay T_switch_N_cells is required. This is because the UE has to decode all of the DCIs, perform all of the software configurations for the set of new BWPs, and perform all of the RF configurations for the set of new BWPs.

Thus, due to the increasing delay T_switch_N_cells with increasing number of cells over which the simultaneous BWP switch has to take place, the delay T_switch_N_cells may be greater than one or more k0 (or k2) indicated in the set of DCIs sent to the UEs. For instance, with reference to the example of FIG. 5, the T_switch_N_cells exceeds the k0 (or k2) of 30 in the DCI for the new $BWP_{11}$ in cell 1. However, the T_switch_N_cells does not exceed the k0 (or k2) of 29 in the DCI for the new $BWP_{N1}$ in cell N. The following describes example methods for the UE and the base station to perform and control simultaneous BWP switch across multiple cells when the delay T_switch_N_cells exceeds the k0 (or k2) in at least one of the N cells.

FIG. 6 illustrates an example Time Domain Resource Allocation (TDRA) table according to some aspects. The TDRA table is provided to a UE in a radio resource control (RRC) message. The TDRA table includes an index column, a k0 (or k2) column, an SLIV column, and a demodulation reference signal (DMRS) mapping type (e.g., 1 or 2). The manner in which a DCI informs the UE to perform a BWP switch is by providing the index to the TDRA table. The UE accesses the TDRA table to determine the k0 (or k2), SLIV, and DMRS mapping type using the index provided in the DCI. The k0 (or k2) has a range of 0-31. Thus, as illustrated in the example in FIG. 5, the T_switch_N_cells exceeded the range of the k0 (or k2) for the $BWP_{11}$ of cell 1. This is called an out-of-bound condition.

Figure 7A:
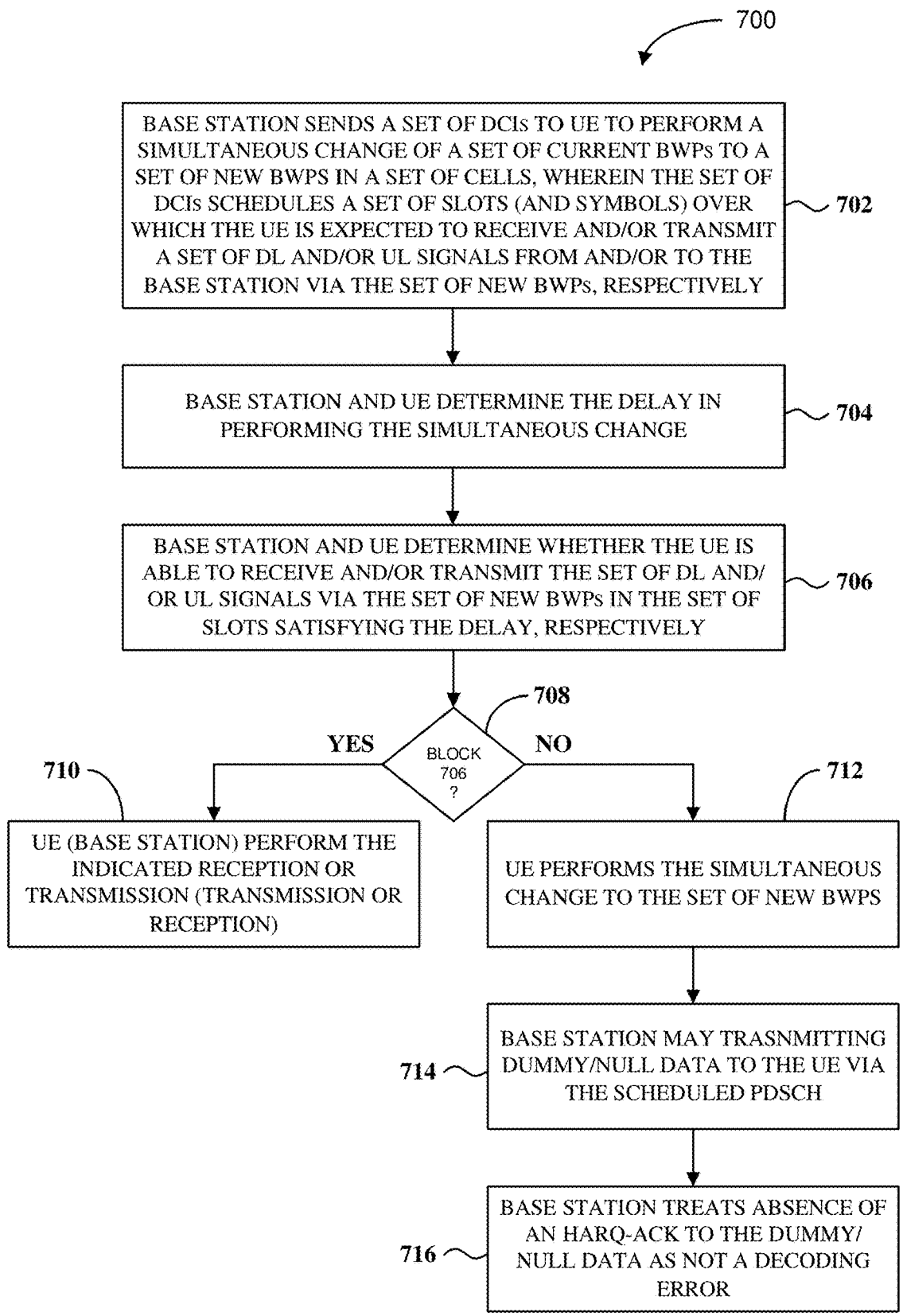
FIG. 7A illustrates a flow diagram of an example method of controlling and performing a bandwidth part (BWP) switch across a set of cells according to some aspects.

FIG. 7A illustrates a flow diagram of an example method 700 of controlling and performing a bandwidth part (BWP) switch across a set of cells according to some aspects. In summary, if any of the k0s (or k2s) for any of the BWP switch across a set of N cells do not meet or exceed the time delay T_switch_N_cells, the UE is allowed to perform the simultaneous BWP switch across the set of cells, but is not expected to receive or transmit in the scheduled PDSCH or PUSCH for at least the one or more cells in which the one or more k0s (or k2s) does not meet or exceed the time delay T_switch_N_cells; or optionally, in all of the scheduled PDSCH or PUSCH of the set of N cells. This may be referred to as a "null assignment."

The base station may transmit dummy bits to the UE via the one or more PDSCH associated with the one or more cells, but the base station may not be expected to receive one or more acknowledgements (e.g., hybrid automatic repeat request (HARQ) acknowledgements (ACKs)) from the UE indicating the dummy bits were successfully received. In this regard, the base station does not treat the absence of the HARQ ACK as a decoding error. In another example, the UE may send acknowledgements (e.g., ACKs) for receiving the scheduling information despite the scheduled PDSCH is not received. This way, the base station may get confirmation that the DCI carrying the BWP instruction is correctly received by the UE.

In particular, the method 700 includes a base station sending a set of instructions (e.g., DCIs) to the UE to perform a simultaneous change of a set of current BWPs to a set of new BWPs in a set of cells, wherein the set of instructions schedules a set of slots (and symbols) over which the UE is expected to receive and/or transmit a set of DL and/or UL signals from and/or to the base station via the set of new BWPs, respectively (block 702). The method 700 further includes the base station and the UE determining the delay T_switch_N_cells over which the UE is to perform the simultaneous change of the set of current BWPs to the set of new BWPs (block 704). As discussed, the T_switch_N_cells may be determined in accordance with Eq. 1 discussed above.

The method 700 further includes the base station and the UE determining whether the UE is able to receive and/or transmit the set of DL and/or UL signals via the set of new BWPs in the set of slots satisfying the delay, respectively (block 706). That is, the base station and the UE determines whether one or more of the set of k0s (or k2) associated with the set of cells meet or exceed the delay T_switch_N_cells.

If it is determined that the UE is able to receive and/or transmit the set of DL and/or UL signals via the set of new BWPs in the set of slots satisfying the delay T_switch_N-_cells (block 708), the UE receives and/or transmits the set of DL and/or UL signals via the set of new BWPs in the set of slots, respectively (block 710). Consequently, the base station transmits and/or receives the set of DL and/or UL signals via the set of new BWPs in the set of slots, respectively.

If, in block 708, it is determined that the UE is not able to receive and/or transmit the set of DL and/or UL signals via the set of new BWPs in the set of slots satisfying the delay T_switch_N_cells, the method 700 includes the UE performing the simultaneous change of the set of current BWPs to the set of new BWPs, respectively (block 712). If any one or more k0s (or k2s) of one or more of the set of cells meets or exceeds the delay T_switch_N_cells, the UE may be allowed to receive and/or transmit the DL and/or UL signals in the scheduled one or more of the set of slots that meets or exceeds the delay, respectively.

The method 700 may further include the base station transmitting dummy data (e.g., smallest transport block size (TBS)) or even null data (e.g., the scheduled PDSCH does not occupy any physical resources) to the UE via the scheduled PDSCH of the one or more new BWP of the set (block 714). In such case, as the UE is not expected to receive the PDSCH including dummy or null data, the method 700 includes the base station not treating the absence in receiving acknowledgements (e.g., HARQ-ACK) of the PDSCH from the UE as a PDSCH decoding error (block 716). Thus, the base station may perform another scheduling associated with the set of new BWPs for the reception and/or transmission of DL and/or UL signals. As the UE has already performed the BWP switch, this saves significant time if otherwise the UE is not allowed to perform the simultaneous BWP switch if any of the k0s (or k2s) do not meet or exceed the delay T_switch_N_cells.

Figure 7B:
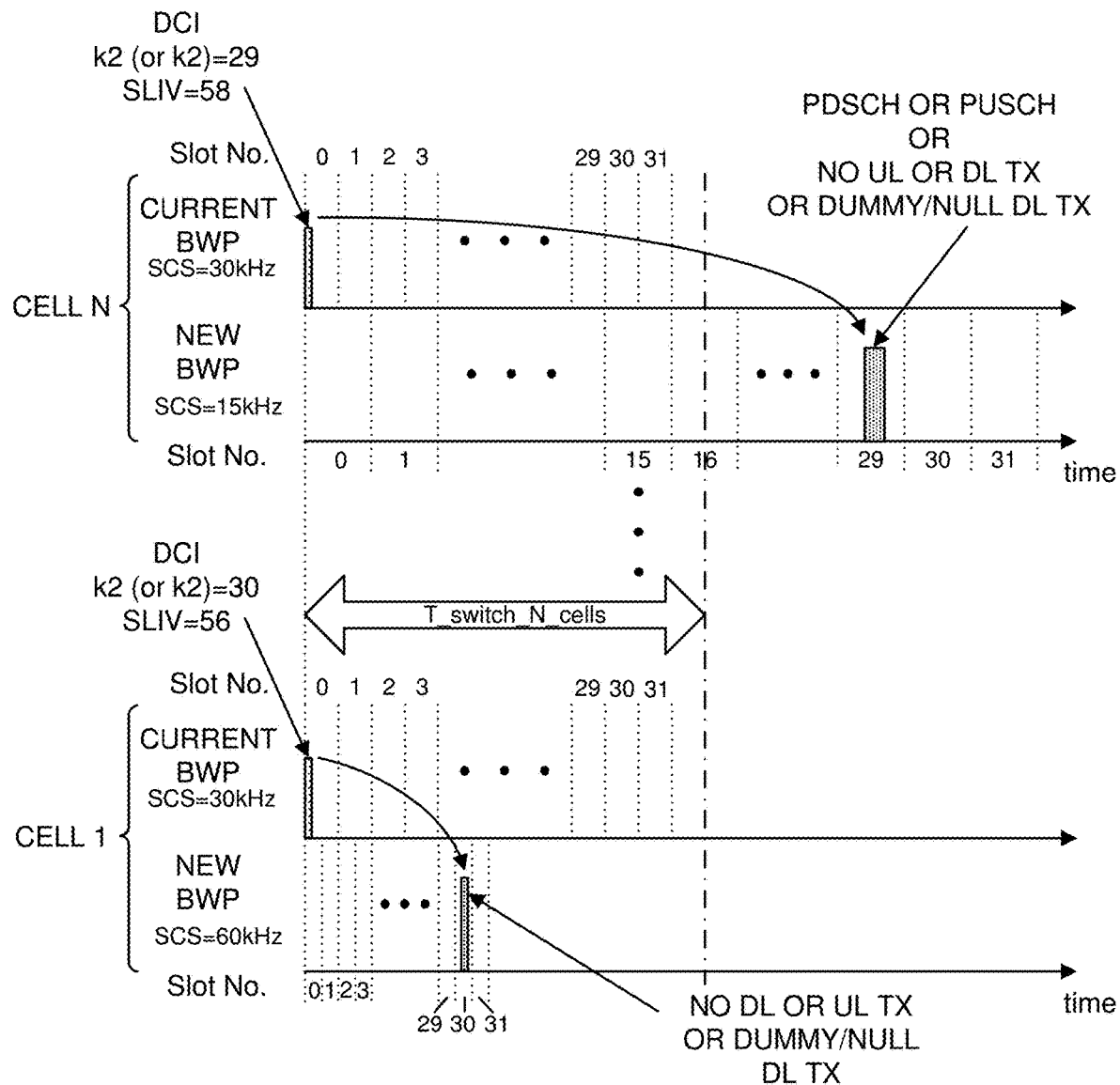
FIG. 7B illustrates a timing diagram of an example bandwidth part (BWP) switch operation across a set of cells performed by a user equipment (UE) in accordance with the method of FIG. 7A.

FIG. 7B illustrates a timing diagram of an example bandwidth part (BWP) switch operation across a set of cells performed by a user equipment (UE) in accordance with the method 700. The BWP switch operation has similar conditions as the BWP switch operation previously discussed with reference to FIG. 5. However, in the example of FIG. 7B, the UE is allowed to perform the simultaneous change of the set of current BWPs to the set of new BWPs for the set of cells 1 to N, respectively. Further, according to the method 700, the UE is not expected to receive DL signals and/or transmit UL signals in the scheduled slots if any of the k0s (or k2s) does not meet or exceed the delay T_switch_N_cells (e.g., slot 30 in cell 1 and slot 29 in cell N). Optionally, the UE may receive DL signal and/or transmit UL signal in the scheduled slot for those k0 (or k2) that meets or exceeds the delay T_switch_N_cells not for those k0 (or k2) that do not meet or exceed the delay T_Switch_N_Cells. Also, as discussed, the base station may transmit dummy or null data via the scheduled PDSCH, but is not expected to receive acknowledgements (HARQ ACKs), and does not treat the absence of such acknowledgements as PDSCH decoding errors.

Figure 8A:
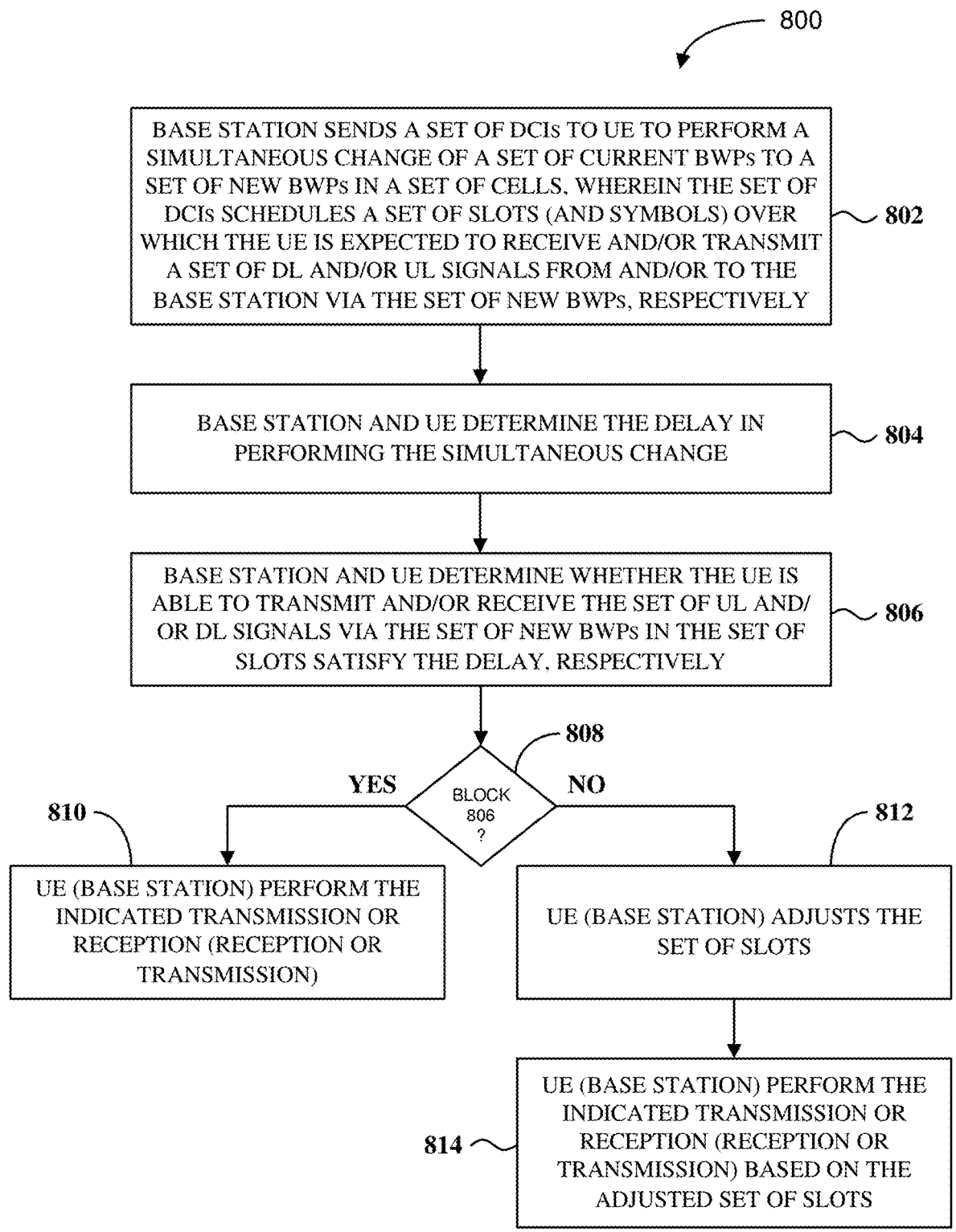
FIG. 8A illustrates a flow diagram of another example method of controlling and performing a bandwidth part (BWP) switch across a set of cells according to some aspects.

FIG. 8A illustrates a flow diagram of another example method 800 of controlling and performing a bandwidth part (BWP) switch across a set of cells according to some aspects. In summary, if any of the k0s (or k2s) for any of the BWP switch across a set of N cells do not meet or exceed the delay T_switch_N_cells, the UE is allowed to perform the simultaneous BWP switch across the set of cells, and may expect to receive and/or transmit in the scheduled PDSCH and/or PUSCH in a set of adjusted slots. The adjusted slots (e.g., adjusted k0s (or k2s)) meet or exceed the delay T_switch_N_cells; thereby, allowing the UE to perform the reception and/or transmission in the scheduled PDSCH and/or PUSCH.

In particular, the method 800 includes a base station sending a set of instructions (e.g., DCIs) to the UE to perform a simultaneous change of a set of current BWPs to a set of new BWPs in a set of cells, wherein the set of instructions schedules a set of slots (and symbols) over which the UE is expected to receive and/or transmit a set of DL and/or UL signals from and/or to the base station via the set of new BWPs, respectively (block 802). The method 800 further includes the base station and the UE determining the delay T_switch_N_cells over which the UE is to perform the simultaneous change of the set of current BWPs to the set of new BWPs (block 804). As discussed, the T_switch_N_cells may be network determined in accordance with Eq. 1 discussed above.

The method 800 further includes the base station and the UE determining whether the UE is able to receive and/or transmit the set of DL and/or UL signals via the set of new BWPs in the set of slots satisfying the delay, respectively (block 806). That is, the base station and the UE determines whether the set of k0s (or k2) associated with the set of cells meet or exceed the delay T_switch_N_cells.

If it is determined that the UE is able to receive and/or transmit the set of DL and/or UL signals via the set of new BWPs in the set of slots satisfying the time delay T_switch_N_cells (block 808), the UE receives and/or transmits the set of DL and/or UL signals via the set of new BWPs in the set of slots, respectively (block 810). Consequently, the base station transmits and/or receives the set of DL and/or UL signals via the set of new BWPs in the set of slots, respectively.

If, in block 808, it is determined that the UE is not able to transmit and/or receive the set of UL and/or DL signals (communicate with the base station) via the set of new BWPs in the set of slots satisfying the delay T_switch_N_cells, the method 800 includes the UE and base station adjusting the set of slots by an amount such that the scheduled PDSCH and/or PUSCH occurs after the delay T_switch_N_cells (block 812). For example, the adjustment of the set of slots may be based on the number N of cells over which the simultaneous BWP switch is performed, and/or based on the number K of simultaneous BWP switches that the UE is able to perform, and/or based on the capability of the UE (e.g., capable of type 1 $T_{BWPSwitchDelay}$ or type 2 $T_{BWPSwitchDelay}$).

Alternatively, in block 812, the adjustment of the set of slots may be based on N', which is the number of cells over which the simultaneous BWP switch is to be performed as determined by the UE in detecting the set of instructions (e.g., DCIs). If, however, the UE mis-detects one or more of the instructions, the scheduled PDSCH and/or PUSCH as determined by the UE may not match the scheduled PDSCH and/or PUSCH as determined by the base station. That is, the base station determines the adjustment based on N, whereas the UE determines the adjustment based on N'. To cure this problem, the adjustment may be based on a quantization of N' such that the quantization of N' matches the quantization of N. For example, if the slot quantization factor is 4, and N is 3, and N' is 2, then N and N' are quantized to 4; thereby, resulting in the scheduled PDSCH and/or PUSCH as determined by the UE matching the scheduled PDSCH and/or PUSCH as determined by the base station.

The base station may avoid certain Ns (the number of simultaneous BWP switches across the set of cells) that are close and above the quantization factor. For example, if the slot quantization factor is 4, then the base station may exclude N of 5, 9, 13, etc. This is because if the UE mis-detects a DCI, and N is 5, 9, or 13, then the UE determines N' as 4, 8 or 12, and quantizes N' as 4, 8, or 12 based on a slot quantization factor of 4, respectively. However, the base station quantizes N of 5, 9, or 13 to 8, 12, or 16, respectively, which does not match the quantized N'.

This causes the UE to receive and/or transmit the DL and/or UL signal from and/or to the base station in the wrong adjusted slots.

The method 800 further includes the UE receiving and/or transmitting the set of DL and/or UL signals via the set of new BWPs in the set of adjusted slots, respectively (block 814). Consequently, the base station transmits and/or receives the set of DL and/or UL signals via the set of new BWPs in the set of adjusted slots, respectively.

Figure 8B:
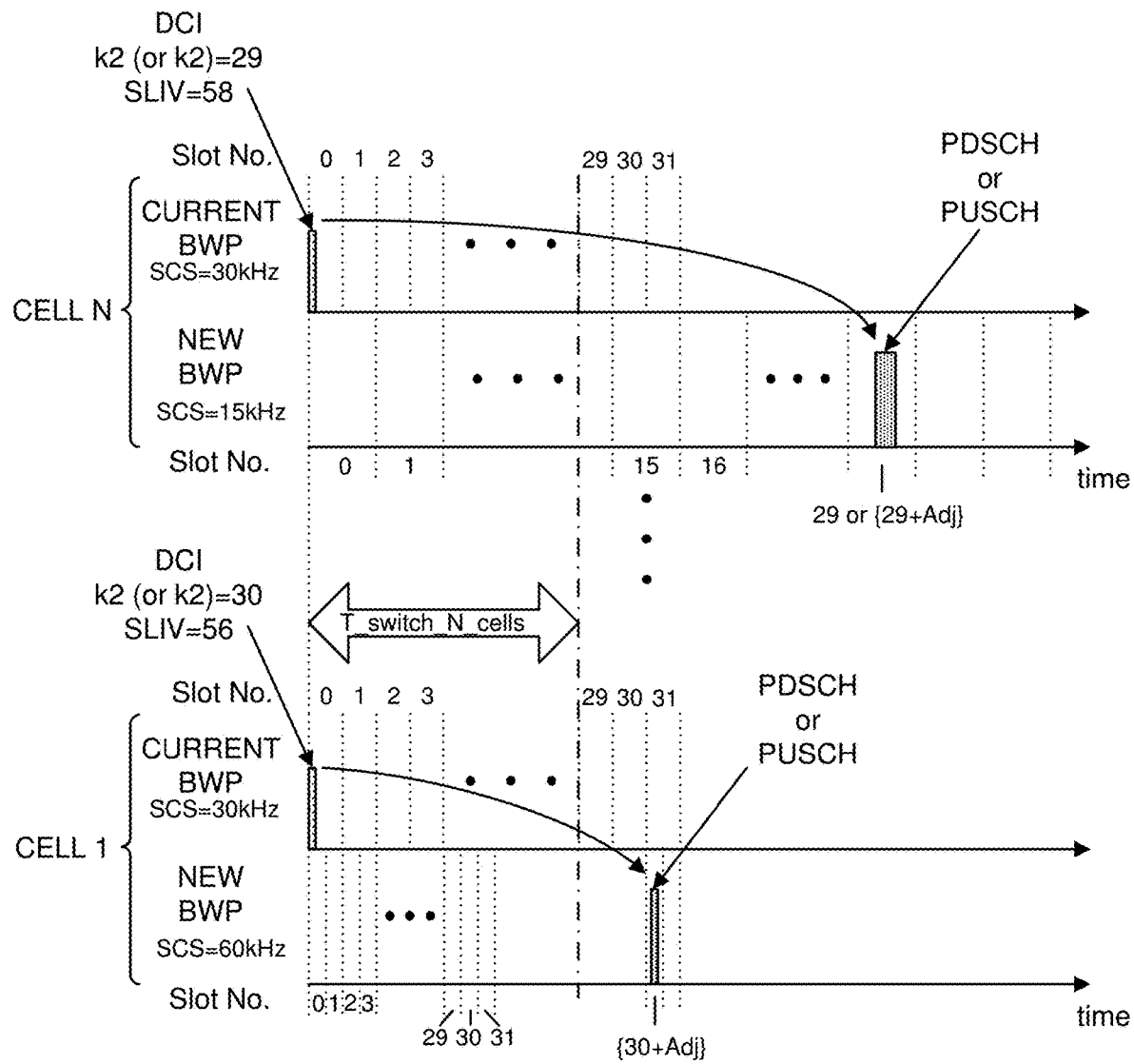
FIG. 8B illustrates a timing diagram of another example bandwidth part (BWP) switch operation across a set of cells performed by a user equipment (UE) in accordance with the method of FIG. 8A.

FIG. 8B illustrates a timing diagram of an example bandwidth part (BWP) switch operation across a set of cells performed by a user equipment (UE) in accordance with the method 800. The BWP switch operation has similar conditions as the BWP switch operation previously discussed with reference to FIG. 5. However, in the example of FIG. 8B, the UE performs the reception and/or transmission via the PDSCH and/or PUSCH in the slots {30+adj} and {29+adj} in cells 1 and N, respectively. As the non-adjusted slot (e.g., 29) in cell N meets or exceeds the delay T_switch_N_cells, the UE may optionally perform the reception and/or transmission via the PDSCH and/or PUSCH in the slot 29 in cell N.

Figure 9A:
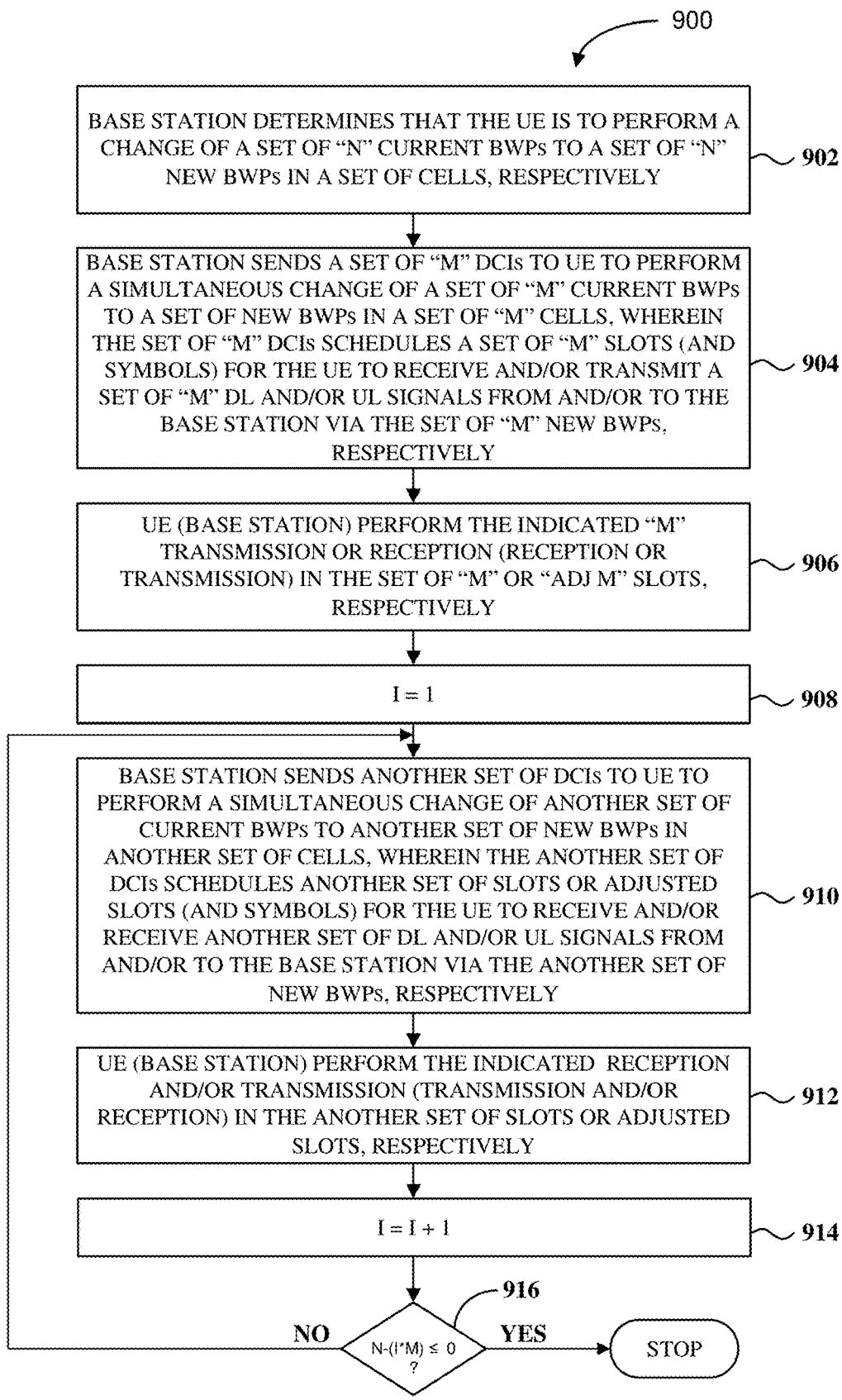
FIG. 9A illustrates a flow diagram of another example method of controlling and performing a bandwidth part (BWP) switch across a set of cells according to some aspects.

FIG. 9A illustrates a flow diagram of another example method 900 of controlling and performing a bandwidth part (BWP) switch across a set of cells according to some aspects. In summary, the network sets a maximum number M of simultaneous BWP switches across a set of M cells that a UE can perform, where M may be less than the required number N of BWP switches across a set of N cells. The number M may be set such that most BWP switches across a set of M cells may be achieved. The remaining number N-M BWP switches may be performed in one or more consecutive phases where the maximum number M is used for each phase. In the event that the number M still results in one or more k0s (or k2s) not meeting or exceeding a delay T_switch_M_cells (based on M cells not N), the corresponding one or more slots for receiving and/or transmitting via the PDSCH and/or PUSCH may be adjusted per the method 800 previously discussed; or the UE may perform the BWP switch but not receive and/or transmit as per the method 700 previously discussed. The delay T_switch_M_cells, which may be network configured, may be based on M, the capability of the UE (e.g., type 1 or type 2), and K the number of simultaneous BWP switch that the UE is able to process in parallel.

In particular, the method 900 includes a base station determining that the UE is to perform a change of a set of N current BWPs to a set of N new BWPs in a set of N cells, respectively (block 902). The method 900 further includes the base station sending a set of "M" instructions (e.g., DCIs) to UE to perform a (first (I=0) phase) simultaneous change of a set of "M" current BWPs to a set of new BWPs in a set of M cells, wherein the set of M instructions schedules a set of "M" slots (and symbols) for the UE to receive and/or transmit a set of "M" DL and/or UL signals from and/or to the base station via the set of "M" new BWPs, respectively (block 904). As discussed, the number M may be a network-configured maximum number of simultaneous BWP switches across a set of M cells that a UE can perform, where M may be less than the number N of BWP switches across a set of N cells that is required.

The method 900 further includes the UE performing the set of M receptions and/or transmissions in the set of M slots and/or a set of adjusted M slots per the method 800 previously discussed (block 906). Consequently, the base station transmits and/or receives the M signals in the set of M slots or a set of adjusted M slots per the method 800. The method 900 further includes setting the phase indicator I to one (1) (block 908). The remaining operations 910 to 916 is for completing the remaining BWP switches to achieve the BWP switches across the set of N cells.

The method 900 additionally includes the base station sending another set of (e.g., the smaller of N−(I*M) or M) instructions (e.g., DCIs) to the UE to perform a simultaneous change of another set of current BWPs to another set of new BWPs in another set of cells, wherein the other set of instructions schedules another set of slots or adjusted slots (and symbols) for the UE to receive and/or transmit another set of DL and/or UL signals from and/or to the base station via the other set of new BWPs, respectively (block 910).

The method 900 further includes the UE performing the other set of receptions and/or transmissions in the other set of slots or adjusted M slots per the method 800 previously discussed (block 912). Consequently, the base station performs another set of transmission and/or receptions the in the other set of slots or adjusted slots per the method 800. The method 900 further includes incrementing the phase indicator I by one (1) (block 914).

Additionally, the method 900 includes the UE and the base station determining whether N−(I*M) is less or equal to zero (0) (block 916). If N−(I*M) is less than or equal to zero (0), then all phases of BWP switches have been completed to achieve the N BWP switch across a set of N cell. If, on the other hand, N−(I*M) is greater than zero (0), then one or more additional phases of BWP switches remain to achieve the N BWP switch across the set of N cell. In such case, the method 900 returns to block 910.

Figure 9B:
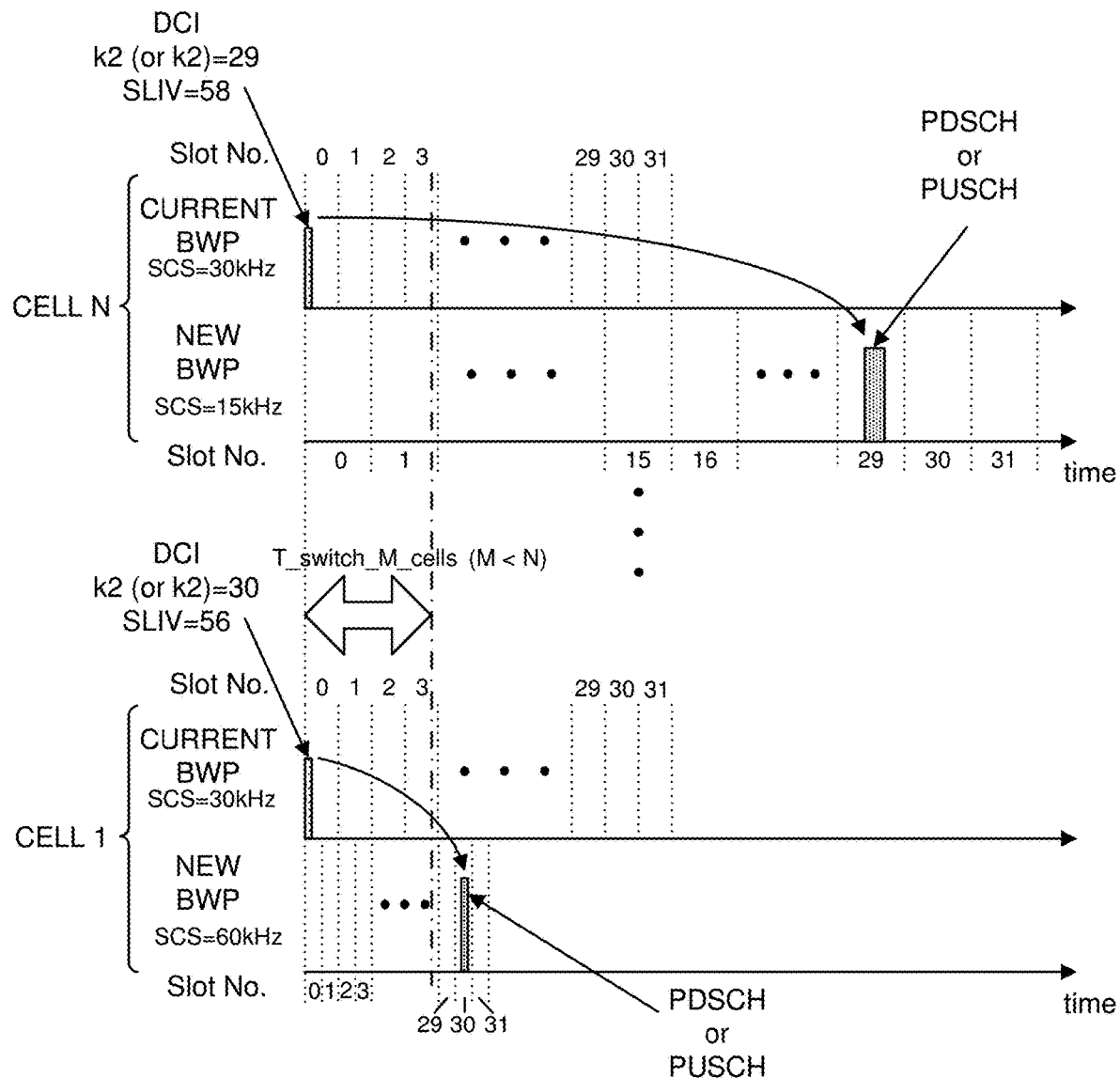
FIG. 9B illustrates a timing diagram of another example bandwidth part (BWP) switch operation across a set of cells performed by a user equipment (UE) in accordance with the method of FIG. 9A.

FIG. 9B illustrates a timing diagram of another example bandwidth part (BWP) switch operation across a set of cells performed by a user equipment (UE) in accordance with the method of 900. As indicated, the network-configured maximum number M of simultaneous BWP switches most likely results in the k0s (or k2s) meeting or exceeding the time delay T_switch_M_cells; thereby, allowing the UE to receive and/or transmit via the scheduled PDSCH and/or PUSCH. In this example, the delay T_switch_M_cells is 29 slots in the new BWP of cell 1, which is less than the scheduled slot 30 for the PDSCH and/or PUSCH. Similarly, the delay T_switch_M_cells is 2 slots in the new BWP of cell N, which is less than the scheduled slot 29 for the PDSCH and/or PUSCH.

Figure 10:
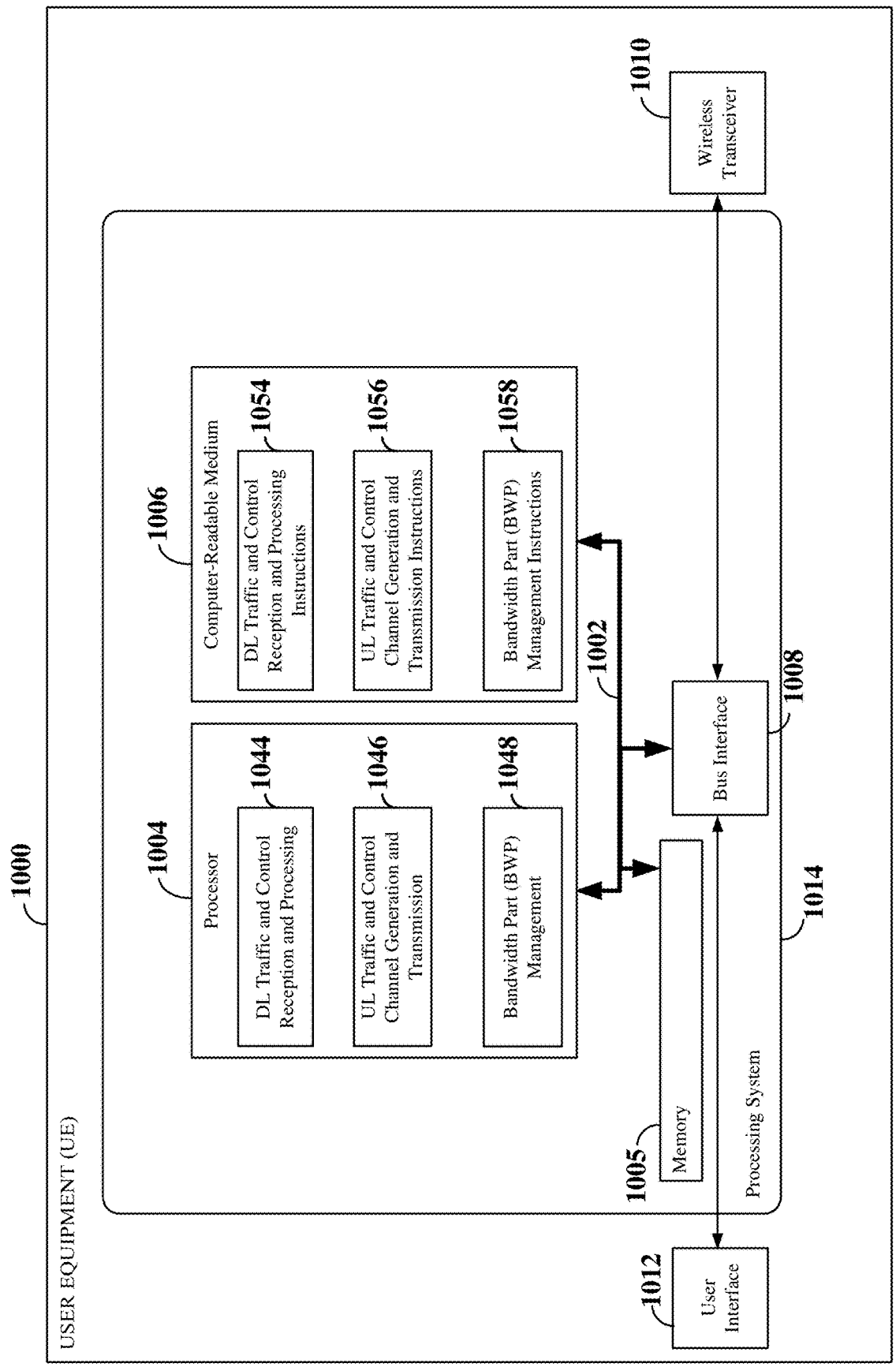
FIG. 10 is a diagram illustrating an example of a hardware implementation for a user equipment (UE) processing system for performing simultaneous bandwidth part (BWP) switches across a set of cells according to some aspects.

FIG. 10 is a block diagram illustrating an example of a hardware implementation for a user equipment (UE) 1000 employing a processing system. For example, the UE 1000 may correspond to any of the UEs previously discussed herein.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in the UE 1000, may be used to implement any one or more of the processes and procedures described below.

The processor 1004 may in some instances be implemented via a baseband or modem chip and in other implementations, the processor 1004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further.

A bus interface 1008 provides an interface between the bus 1002 and a wireless transceiver 1010. The wireless transceiver 1010 allows for the UE 1000 to communicate with various other apparatus over a transmission medium (e.g., air interface). Depending upon the nature of the apparatus, a user interface 1012 (e.g., keypad, display, touch screen, speaker, microphone, control knobs, etc.) may also be provided. Of course, such a user interface 1012 is optional, and may be omitted in some examples.

The processor 1004 is responsible for managing the bus 1002 and general processing, including the execution of software stored on the computer-readable medium 1006. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. In some examples, the computer-readable medium 1006 may be part of the memory 1005. Those skilled in the art will recognize how best to implement the described functionality presented throughout this disclosure depending on the particular application and the overall design constraints imposed on the overall system.

In some aspects of the disclosure, the processor 1004 includes DL traffic and control reception and processing circuitry 1044 for receiving information from a base station, as described herein. For example, the DL traffic and control reception and processing circuitry 1044 of a UE may be configured to receive messages from a base station to perform a simultaneous bandwidth part (BWP) switch across a set of cells in accordance with a particular configuration. The DL traffic and control reception and processing circuitry 1044 of a UE may be configured to receive data in a PDSCH from a base station via a set of new BWPs resulting from a BWP switch across a set of cells in accordance with another particular configuration. The DL traffic and control reception and processing circuitry 1044 may further be configured to execute DL traffic and control reception and processing instructions (software) 1054 stored in the computer-readable medium 1006 to implement one or more of the functions described herein.

The processor 1004 may further include uplink (UL) traffic and control channel generation and transmission circuitry 1046 configured to transmit information via uplink control and traffic channels to a base station. For example, the UL traffic and control channel generation and transmission circuitry 1046 of a UE may be configured to transmit uplink data in a PUSCH to a base station via a set of new BWPs resulting from a simultaneous BWP switch across a set of cells in accordance with a particular configuration. The UL traffic and control channel generation and transmission circuitry 1046 may further be configured to execute UL traffic and control channel generation and transmission instructions (software) 1056 stored in the computer-readable medium 1006 to implement one or more of the functions described herein.

The processor 1004 may further include a bandwidth part (BWP) management circuitry 1048 configured to manage simultaneous BWP switching over a set of cells. The BWP management circuitry 1048 may further be configured to execute BWP management instructions (software) 1058 stored in the computer-readable medium 1006 to implement one or more of the functions described herein.

Figure 11:
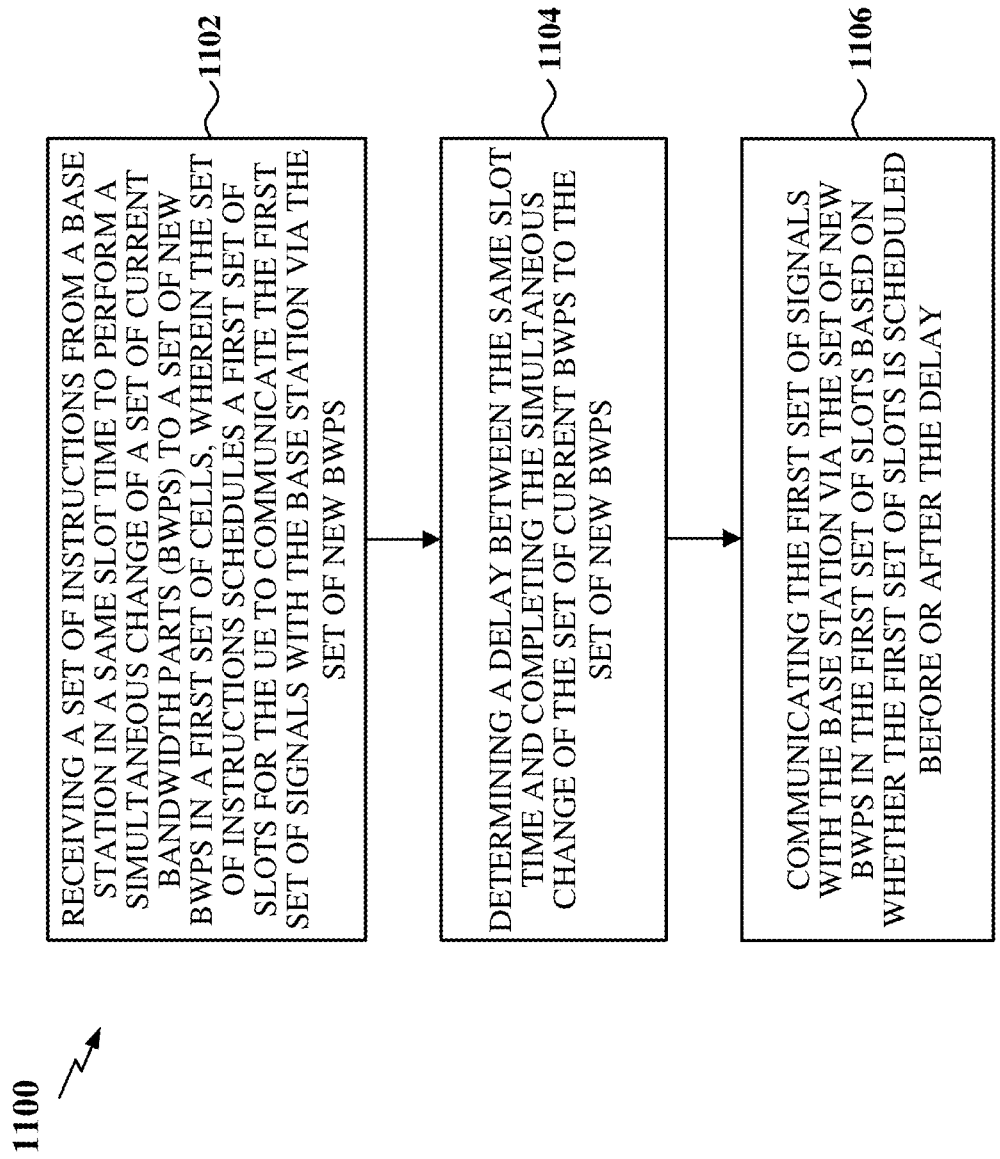
FIG. 11 is a flow diagram of an exemplary method, implemented in a user equipment (UE), for performing simultaneous bandwidth part (BWP) switches across a set of cells according to some aspects.

FIG. 11 is a flow diagram of an exemplary method 1100 for wireless communication at a user equipment (UE). As described below, some or all illustrated features may be omitted in a particular implementation within the scope of the present disclosure, and some illustrated features may not be required for implementation of all examples. In some examples, the process 1100 may be carried out by the UE 1000 illustrated in FIG. 10. In some examples, the process 1100 may be carried out by any suitable apparatus or means for carrying out the functions or algorithm described below.

The method 1100 includes receiving a set of instructions from a base station in a same slot time to perform a simultaneous change of a set of current bandwidth parts (BWPs) to a set of new BWPs in a first set of cells, wherein the set of instructions schedules a first set of slots for the UE to communicate a first set of signals with the base station via the set of new BWPs (block 1102). For example, the DL traffic and control reception and processing circuitry 1044 shown and described above with reference to FIG. 10 may provide means to receive the set of instructions from the base station per block 1102.

The method 1100 further includes determining a delay between the same time slot and completing the simultaneous change of the set of current BWPs to the set of new BWPs (block 1104). For example, the bandwidth part (BWP) management circuitry 1048 may provide means to determine the delay per block 1104.

The method 1100 further includes communicating the first set of signals with the base station via the set of new BWPs in the first set of slots based on whether the first set of slots is scheduled before or after the delay (block 1106). For example, the bandwidth part (BWP) management circuitry 1048 may provide the means to communicate the first set of signals with the base station per block 1106.

The method 1100 may further include changing the at least one of the first set of slots to at least one of a second set of slots in response to determining that the at least one of the first set of slots is scheduled before the delay; and communicating at least one of the first set of signals with the base station via the at least one of the set of new BWPs in the at least one of the second set of slots, wherein the at least one of the second set of slots is scheduled after the delay. For example, the bandwidth part (BWP) management circuitry 1048 may provide the means to change the at least one of the first set of slots and the UL traffic and control channel generation and transmission circuitry 1046 may provide the means to communicate at least one of the first set of signals with the base station.

The method 1100 may further include determining the at least one of the second set of slots based on the delay. For example, the bandwidth part (BWP) management circuitry 1048 may provide the means to change the at least one of the first set of slots and means to determine the at least one of the second set of slots based on the delay.

Figure 12:
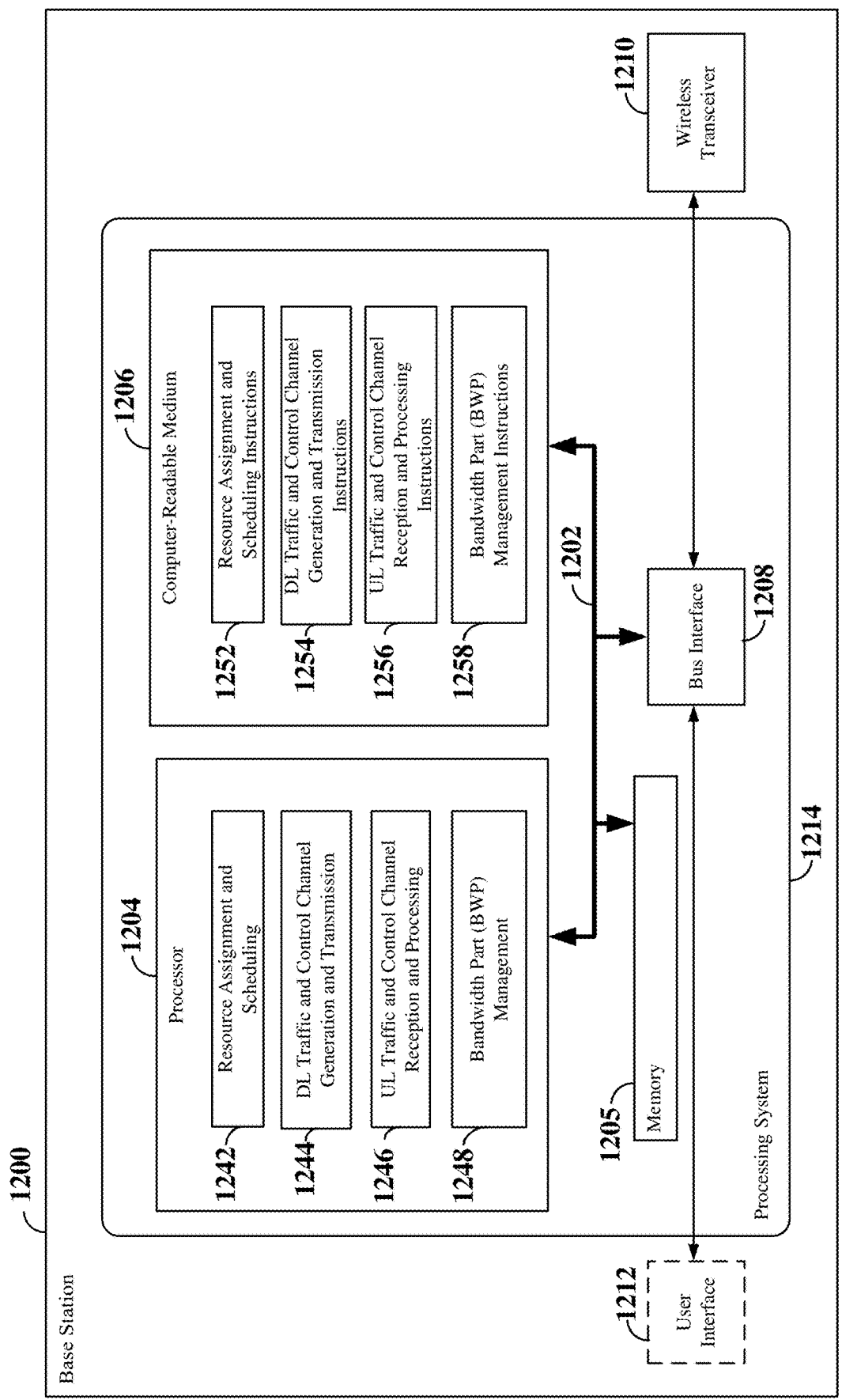
FIG. 12 is a diagram illustrating an example of a hardware implementation for a base station processing system for controlling simultaneous bandwidth part (BWP) switches across a set of cells by a user equipment (UE) according to some aspects.

FIG. 12 is a block diagram illustrating an example of a hardware implementation for a base station 1200 employing a processing system. For example, the base station 1200 may correspond to any of the base stations previously discussed herein.

The base station 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station device 1200 may be configured to perform any one or more of the functions described herein. That is, the processor 1204, as utilized in the base station 1200, may be used to implement any one or more of the processes and procedures described below.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 links together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further.

A bus interface 1208 provides an interface between the bus 1202 and a wireless transceiver 1210. The wireless transceiver 1210 allows for the base station 1200 to communicate with various other apparatus over a transmission medium (e.g., air interface). Depending upon the nature of the apparatus, a user interface 1212 (e.g., keypad, display, touch screen, speaker, microphone, control knobs, etc.) may also be provided. Of course, such a user interface 1212 is optional, and may be omitted in some examples.

The processor 1204 is responsible for managing the bus 1202 and general processing, including the execution of software stored on the computer-readable medium 1206. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. In some examples, the computer-readable medium 1206 may be part of the memory 1205. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. For example, the processor 1204 may include resource assignment and scheduling circuitry 1242 configured to assign and schedule resources for downlink and uplink transmissions with one or more UEs via one or more cellular communication links, respectively. For example, the resource assignment and scheduling circuitry 1242 of a base station is configured to assign and schedule resources for uplink and downlink communication links in a set of bandwidth parts (BWPs) across a set of cells, as discussed herein. The resource assignment and scheduling circuitry 1242 may further be configured to execute resource assignment and scheduling instructions (software) 1252 stored in the computer-readable medium 1206 to implement one or more of the functions described herein.

The processor 1204 further includes a DL traffic and control channel generation and transmission circuitry 1244 for transmitting DL data to one or more UEs, as described herein. For example, the DL traffic and control channel generation and transmission circuitry 1244 of a base station may be configured to send messages instructing UEs to perform simultaneous BWP switch across a set of cells, and transmit downlink data to UEs via a set of new BWPs resulting from the BWP switch in accordance with a particular configuration. The DL traffic and control channel generation and transmission circuitry 1244 may further be configured to execute DL traffic and control channel generation and transmission instructions (software) 1254 stored in the computer-readable medium 1206 to implement one or more of the functions described herein.

The processor 1204 may further include uplink (UL) traffic and control reception and processing circuitry 1246 configured to receive and process data sent via uplink control channels and uplink traffic channels from one or more UEs. For example, the UL traffic and control channel reception and processing circuitry 1246 of a base station may be configured to receive uplink data and acknowledgements via a set of new BWP resulting from a simultaneous BWP switch across a set of cells performed by UEs, as described herein. The UL traffic and control channel reception and processing circuitry 1246 may further be configured to execute UL traffic and control channel reception and processing instructions (software) 1256 stored in the computer-readable medium 1206 to implement one or more of the functions described herein.

The processor 1204 may further include a bandwidth part (BWP) management circuitry 1248 configured to manage user equipment (UEs) perform simultaneous BWP switch over a set of cells. The BWP management circuitry 1248 may further be configured to execute BWP management instructions (software) 1258 stored in the computer-readable medium 1206 to implement one or more of the functions described herein.

FIG. 13 is a flow chart of a method 1300 for wireless communication at a base station. As described below, some or all illustrated features may be omitted in a particular implementation within the scope of the present disclosure, and some illustrated features may not be required for implementation of all examples. In some examples, the process 1300 may be carried out by the base station 1200 illustrated in FIG. 12. In some examples, the process 1300 may be carried out by any suitable apparatus or means for carrying out the functions or algorithm described below.

The method 1300 includes sending a first set of instructions to a user equipment (UE) in a same slot time to perform a first simultaneous change of a first set of current bandwidth parts (BWPs) to a first set of new BWPs in a first set of cells, wherein the first set of instructions schedules a first set of slots for the UE to communicate a first set of signals with the base station via the first set of new BWPs (block 1302). For example, the DL traffic and control channel generation and transmission circuitry 1244 may provide the means to send the first set of instructions to the UE per block 1302.

The method 1300 further includes determining a delay between the same slot time and completing the first simultaneous change of the first set of current BWPs to the first set of new BWPs by the UE (block 1304). For example, the bandwidth part (BWP) management circuitry 1248 may provide the means to determine the delay per block 1304.

The method 1300 additionally includes communicating the first set of signals with the UE via the first set of new BWPs in the first set of slots based on whether the first set of slots is scheduled before or after the delay (block 1306). For example, the DL traffic and control channel generation and transmission circuitry 1244 may provide the means to communicate the first set of signals with the UE per block 1306.

The method 1300 may further include not communicating the first set of signals with the UE via the first set of new BWPs in the first set of slots if it is determined that the first set of slots is scheduled before the delay. For example, the bandwidth part (BWP) management circuitry 1248 may provide the means not to communicate the first set of signals with the UE.

The method 1300 may further include (wherein if it is determined that the UE is not able to communicate the first set of signals with the base station via the at least one of the first set of new BWPs during the at least one of the first set of slots being scheduled before the delay) communicating at least one of the first set of signals to the UE via the at least one of the first set of new BWPs; and not indicating that the communication of the at least one of the first set of signals involved a decoding error in response to not receiving at least one acknowledgements to the at least one of the first set of signals from the UE. For example, the bandwidth part (BWP) management circuitry 1248 may provide the means not to communicate the first set of signals with the UE and not indicating that the communication of the at least one of the first set of signals involved a decoding error.

The method 1300 may further include communicating the first set of signals with the base station via the first set of new BWPs in a second set of slots in response to determining that the first set of slots is scheduled before the delay. For example, the UL traffic and control channel reception and processing circuitry 1246 may provide the means to communicate the first set of signals with the UE.

The method 1300 may further include determining the second set of slots based on the delay. For example, the bandwidth part (BWP) management circuitry 1248 may provide the means to determine the second set of slots based on the delay.

The method 1300 may further include determining the second set of slots based on a number of the current BWPs in the first set. For example, the bandwidth part (BWP) management circuitry 1248 may provide the means to determine the second set of slots based on a number of the current BWPs in the first set.

The method 1300 may further include determining the second set of slots based on a number of BWP changes the UE is capable of processing in parallel. For example, the bandwidth part (BWP) management circuitry 1248 may provide the means to determine the second set of slots.

The method 1300 may also include determining the second set of slots based on a number of the first set of instructions and a slot quantization factor. For example, the bandwidth part (BWP) management circuitry 1248 may provide the means to determine the second set of slots based on a number of the first set of instructions and a slot quantization factor.

The method 1300 may also include determining the number of the first set of instructions based on the slot quantization factor. For example, the bandwidth part (BWP) management circuitry 1248 may provide the means to determine the number of the first set of instructions based on the slot quantization factor.

The method 1300 may additionally include communicating the least one of the first set of signals with the UE via the at least one of the first set of new BWPs in the at least one of a second set of slots scheduled after the delay in response to at least one of the first set of slots being scheduled before the delay. For example, the UL traffic and control channel reception and processing circuitry 1246 may provide the means to communicate the least one of the first set of signals with the UE.

The method 1300 may also include determining the at least one of the second set of slots based on the delay. For example, the bandwidth part (BWP) management circuitry 1248 may provide the means to determine the at least one of the second set of slots based on the delay.

The method 1300 may additionally include determining the at least one of the second set of slots based on a number of the current BWPs in the first set. For example, the bandwidth part (BWP) management circuitry 1248 may provide the means to determine the at least one of the second set of slots based on a number of the current BWPs in the first set.

The method 1300 may also include determining the at least one of the second set of slots based on a number of BWP changes the UE is capable of processing in parallel. For example, the bandwidth part (BWP) management circuitry 1248 may provide the means to determine the at least one of the second set of slots based on a number of BWP changes the UE is capable of processing in parallel.

The method 1300 may also include determining the at least one of the second set of slots based on a number of the first set of instructions and a slot quantization factor. For example, the bandwidth part (BWP) management circuitry 1248 may provide the means to determine the at least one of the second set of slots based on a number of the first set of instructions and a slot quantization factor.

The method 1300 may additionally include determining the number of the first set of instructions based on the slot quantization factor. For example, the bandwidth part (BWP) management circuitry 1248 may provide the means to determine the number of the first set of instructions based on the slot quantization factor.

The method 1300 may also include determining that the UE is to perform a change of a second set of current BWPs to a second set of new BWPs, wherein the second set of current BWPs include the first set of current BWPs and the second set of new BWPs include the first set of new BWPs; and sending a second set of one or more instructions to the UE to perform a change or a second simultaneous change of a third set of one or more current BWPs to a third set of one or more new BWPs in a second set of one or more cells, wherein the third set of one or more current BWPs include one or more of the second set of current BWPs not in the first set of current BWPs, wherein the third set of one or more new BWPs include one or more of the second set of new BWPs not in the first set of new BWPs, and wherein the second set of one or more instructions schedules a second set of one or more slots for the UE to communicate the first set of signals with the base station via the third set of one or more new BWPs. For example, the bandwidth part (BWP) management circuitry 1248 may provide the means to determine that the UE is to perform a change of a second set of current BWPs to a second set of new BWPs; and DL traffic and control channel reception and transmission circuitry 1244 may provide the means send a second set of one or more instructions to the UE.

The method 1300 may additionally include communicating at least one of the first set of signals with the UE via the at least one of the third set of one or more new BWPs in at least one of a third set of one or more slots scheduled after the delay in response to determining that the UE is not able to communicate the first set of signals with the base station via at least one of the third set of one or more new BWPs based on at least one of the second set of one or more slots being scheduled before the delay. For example, the UL traffic and control channel reception and processing circuitry 1246 may provide the means to communicate the least one of the first set of signals with the UE.

The following provides an overview of aspects of the present disclosure:

Aspect 1: A method for wireless communication at a user equipment (UE), the method comprising: receiving a set of instructions from a base station in a same slot time to perform a simultaneous change of a set of current bandwidth parts (BWPs) to a set of new BWPs in a first set of cells, wherein the set of instructions schedules a first set of slots for the UE to communicate the first set of signals with the base station via the set of new BWPs; determining a delay between the same slot time and completing the simultaneous change of the set of current BWPs to the set of new BWPs; and communicating the first set of signals with the base station via the set of new BWPs in the first set of slots based on whether the first set of slots is scheduled before or after the delay.

Aspect 2: The method of aspect 2, further comprises: changing the at least one of the first set of slots to at least one of a second set of slots in response to determining that the at least one of the first set of slots is scheduled before the delay; and communicating at least one of the first set of signals with the base station via the at least one of the set of new BWPs in the at least one of the second set of slots, wherein the at least one of the second set of slots is scheduled after the delay.

Aspect 3: The method of aspect 3, further comprising determining the at least one of the second set of slots based on the delay.

Aspect 4: The method of aspect 2 or 3, further comprising determining the at least one of the second set of slots based on the delay.

Aspect 5: A wireless communication device in a wireless communication network comprising a wireless transceiver, a memory, and a processor coupled to the wireless transceiver and the memory, the processor and the memory configured to perform a method of any one of aspects 1 through 4.

Aspect 6: A wireless communication device in a wireless communication network comprising at least one means for performing a method of any one of aspects 1 through 4.

Aspect 7: A non-transitory computer-readable medium storing computer-executable code, comprising code for causing a wireless communication device to perform a method of any one of aspects 1 through 4.

Aspect 8: A method for wireless communication at a base station, the method comprising: sending a first set of instructions to a user equipment (UE) in a same slot time to perform a first simultaneous change of a first set of current bandwidth parts (BWPs) to a first set of new BWPs in a first set of cells, wherein the first set of instructions schedules a first set of slots for the UE to communicate a first set of signals with the base station via the first set of new BWPs; determining a delay between the same slot time and completing the first simultaneous change of the first set of current BWPs to the first set of new BWPs by the UE; and communicating the first set of signals with the UE via the first set of new BWPs in the first set of slots using the wireless transceiver based on whether the first set of slots is scheduled before or after the delay.

Aspect 9: The method of aspect 8, further comprising not communicating the first set of signals with the UE via the first set of new BWPs in the first set of slots using the wireless transceiver if it is determined that the first set of slots is scheduled before the delay.

Aspect 10: The method of aspect 8 or 9, wherein if it is determined that the UE is not able to communicate the first set of signals with the base station via the at least one of the first set of new BWPs based on the at least one of the first set of slots being scheduled before the delay, the method further comprises: transmitting at least one of the first set of signals to the UE via the at least one of the first set of new BWPs; and not indicating that the transmission of the at least one of the first set of the downlink signals involved a decoding error in response to not receiving at least one acknowledgements to the at least one of the first set of downlink signals from the UE.

Aspect 11: The method of any one of aspects 8-10, further comprising communicating the first set of signals with the base station via the first set of new BWPs in a second set of slots in response to determining that the the first set of slots is scheduled before the delay.

Aspect 12: The method of any one of aspects 9-11, further comprising determining the second set of slots based on the delay.

Aspect 13: The method of any one of aspects 9-12, further comprising determining the second set of slots based on a number of the current BWPs in the first set.

Aspect 14: The method of any one of aspects 9-13, further comprising determining the second set of slots based on a number of BWP changes the UE is capable of processing in parallel.

Aspect 15: The method of any one of aspects 9-14, further comprising determining the second set of slots based on a number of the first set of instructions and a slot quantization factor.

Aspect 16: The method of any one of aspects 9-15, further comprising determining the number of the first set of instructions based on the slot quantization factor.

Aspect 18: The method of aspect 8-16, further comprising communicating the least one of the first set of signals with the UE via the at least one of the first set of new BWPs in the at least one of a second set of slots scheduled after the delay in response to at least one of the first set of slots being scheduled before the delay.

Aspect 19: The method of any one of aspects 9-18, further comprising determining the at least one of the second set of slots based on the delay.

Aspect 20: The method of any one of aspects 9-19, further comprising determining the at least one of the second set of slots based on a number of the current BWPs in the first set.

Aspect 21: The method of claim any one of aspects 9-20, further comprising determining the at least one of the second set of slots based on a number of BWP changes the UE is capable of processing in parallel.

Aspect 22: The method of any one of aspects 9-21, further comprising determining the at least one of the second set of slots based on a number of the first set of instructions and a slot quantization factor.

Aspect 23: The method of any one of aspects 9-22, further comprising determining the number of the first set of instructions based on the slot quantization factor.

Aspect 24: The method of any one of aspects 8-23, further comprising: determining that the UE is to perform a change of a second set of current BWPs to a second set of new BWPs, wherein the second set of current BWPs include the first set of current BWPs and the second set of new BWPs include the first set of new BWPs; and sending a second set of one or more instructions to the UE to perform a change or a second simultaneous change of a third set of one or more current BWPs to a third set of one or more new BWPs in a second set of one or more cells, wherein the third set of one or more current BWPs include one or more of the second set of current BWPs not in the first set of current BWPs, wherein the third set of one or more new BWPs include one or more of the second set of new BWPs not in the first set of new BWPs, and wherein the second set of one or more instructions schedules a second set of one or more slots for the UE to communicate the first set of signals with the base station via the third set of one or more new BWPs.

Aspect 25: The method of aspect 24, further comprising communicating at least one of the first set of signals with the UE via the at least one of the third set of one or more new BWPs in at least one of a third set of one or more slots scheduled after the delay in response to determining that the UE is not able to communicate the first set of signals with the base station via at least one of the third set of one or more new BWPs based on at least one of the second set of one or more slots being scheduled before the delay.

Aspect 26: A wireless communication device in a wireless communication network comprising a wireless transceiver, a memory, and a processor coupled to the wireless transceiver and the memory, the processor and the memory configured to perform a method of any one of aspects 8 through 25.

Aspect 27: A wireless communication device in a wireless communication network comprising at least one means for performing a method of any one of aspects 8 through 25.

Aspect 28: A non-transitory computer-readable medium storing computer-executable code, comprising code for causing a wireless communication device to perform a method of any one of aspects 8 through 25.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 10, and 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
a processor;
a wireless transceiver communicatively coupled to the processor; and
a memory communicatively coupled to the processor, wherein the processor and the memory are configured to:
receive a set of instructions from a base station in a same slot time, using the wireless transceiver, to perform a simultaneous change of a set of current bandwidth parts (BWPs) to a set of new BWPs in a first set of cells, wherein the set of instructions schedules a first set of slots for the UE to communicate a first set of signals with the base station via the set of new BWPs;
determine a delay between the same slot time and completing the simultaneous change of the set of current BWPs to the set of new BWPs; and
communicate the first set of signals with the base station via the set of new BWPs in the first set of slots based on whether the first set of slots is scheduled before or after the delay.

2. A method for wireless communication at a user equipment (UE), the method comprising:
receiving a set of instructions from a base station in a same slot time to perform a simultaneous change of a set of current bandwidth parts (BWPs) to a set of new BWPs in a first set of cells, wherein the set of instructions schedules a first set of slots for the UE to communicate a first set of signals with the base station via the set of new BWPs;
determining a delay between the same slot time and completing the simultaneous change of the set of current BWPs to the set of new BWPs; and
communicating the first set of signals with the base station via the set of new BWPs in the first set of slots satisfying the delay based on whether the first set of slots is scheduled before or after the delay.

3. The method of claim 2, further comprises:
changing the at least one of the first set of slots to at least one of a second set of slots in response to determining that the at least one of the first set of slots is scheduled before the delay; and
communicating at least one of the first set of signals with the base station via the at least one of the set of new BWPs in the at least one of the second set of slots, wherein the at least one of the second set of slots is scheduled after the delay.

4. The method of claim 3, further comprising determining the at least one of the second set of slots based on the delay.

5. A base station, comprising:
a processor;
a wireless transceiver communicatively coupled to the processor; and
a memory communicatively coupled to the processor, wherein the processor and the memory are configured to:
send a first set of instructions to a user equipment (UE) in a same slot time to perform a first simultaneous change of a first set of current bandwidth parts (BWPs) to a first set of new BWPs in a first set of cells, wherein the first set of instructions schedules a first set of slots for the UE to communicate a first set of signals with the base station via the first set of new BWPs;
determine a delay between the same slot time and completing the first simultaneous change of the first set of current BWPs to the first set of new BWPs by the UE; and
communicate the first set of signals with the UE via the first set of new BWPs in the first set of slots using the wireless transceiver based on whether the first set of slots is scheduled before or after the delay.

6. The base station of claim 5, wherein the processor and the memory are further configured to not communicate the first set of signals with the UE via the first set of new BWPs if it is determined that the first set of slots is scheduled before the delay.

7. The base station of claim 5, wherein the processor and the memory, in response to determining that the UE is not able to communicate the first set of signals with the base station via the at least one of the first set of new BWPs based on the being scheduled before the delay, are configured to:

communicate at least one of the first set of signals to the UE via at least one of the first set of new BWPs using the wireless transceiver; and not indicating that the communication of the at least one of the first set of signals involved a decoding error in response to not receiving at least one acknowledgements of the at least one of the first set of signals from the UE.

8. The base station of claim 5, wherein the processor and the memory, in response to determining that the UE is not able to communicate the first set of signals with the base station via the first set of new BWPs based on the first set of slots being scheduled before the delay, are configured to communicate the first set of signals with the base station via the first set of new BWPs in a second set of slots.

9. The base station of claim 8, wherein the processor and the memory, in response to determining that the UE is not able to communicate the first set of signals with the base station via at least one of the first set of new BWPs based on at least one of the first set of slots being scheduled before the delay, are configured to communicate the first set of signals with the base station via the at least one of the first set of new BWPs in the at least one of the second set of slots, wherein the at least one of the second set of slots is scheduled after the delay.

10. The base station of claim 5, wherein the processor and the memory are further configured to:
determine that the UE is to perform a change of a second set of current BWPs to a second set of new BWPs, wherein the second set of current BWPs include the first set of current BWPs and the second set of new BWPs include the first set of new BWPs; and
send a second set of one or more instructions to the UE, via the wireless transceiver, to perform a change or a second simultaneous change of a third set of one or more current BWPs to a third set of one or more new BWPs in a second set of one or more cells, wherein the third set of one or more current BWPs include one or more of the second set of current BWPs not in the first set of current BWPs, wherein the third set of one or more new BWPs include one or more of the second set of new BWPs not in the first set of new BWPs, and wherein the second set of one or more instructions schedules a second set of one or more slots for the UE to communicate the first set of signals with the base station via the third set of one or more new BWPs.

11. The base station of claim 10, wherein the processor and the memory are configured to communicate a second set of signals with the base station via the at least one of the third set of one or more new BWPs in at least one of a third set of slots scheduled after the delay in response to determining that the UE is not able to communicate the second set of signals with the base station via at least one of the third set of one or more new BWPs based on at least one of the second set of one or more slots being scheduled before the delay.

12. The base station of claim 5, wherein the processor and the memory, in response to determining that the UE is not able to communicate the first set of signals with the base station via the at least one of the third set of one or more new BWPs based on the at least one of the second set of one or more slots being scheduled before the delay, are configured to:
communicate at least one of a second set of signals with the base station via at least one of the third set of one or more new BWPs using the wireless transceiver; and not indicate that the communication of the at least one of the second set of signals involved a decoding error in response to not receiving at least one acknowledgements of the at least one of the second set of signals from the UE.

13. A method for wireless communication at a base station, the method comprising:
sending a first set of instructions to a user equipment (UE) in a same slot time to perform a first simultaneous change of a first set of current bandwidth parts (BWPs) to a first set of new BWPs in a first set of cells, wherein the first set of instructions schedule a first set of slots for the UE to communicate a first set of signals with the base station via the first set of new BWPs;
determining a delay between the same slot time and completing the first simultaneous change of the first set of current BWPs to the first set of new BWPs by the UE; and
communicating the first set of signals with the UE via the first set of new BWPs in the first set of slots based on whether the first set of slots is scheduled before or after the delay.

14. The method of claim 13, further comprising not communicating the first set of signals with the UE via the first set of new BWPs in the first set of slots if it is determined that the first set of slots is scheduled before the delay.

15. The method of claim 13, wherein if it is determined that the UE is not able to communicate the first set of signals with the base station via the at least one of the first set of new BWPs based on the at least one of the first set of slots being scheduled before the delay, the method further comprises:
communicating at least one of the first set of signals to the UE via the at least one of the first set of new BWPs; and
not indicating that the communication of the at least one of the first set of the signals involved a decoding error in response to not receiving at least one acknowledgements to the at least one of the first set of signals from the UE.

16. The method of claim 13, further comprising communicating the first set of signals with the base station via the first set of new BWPs in a second set of slots in response to determining that the first set of slots is scheduled before the delay.

17. The method of claim 16, further comprising determining the second set of slots based on the delay.

18. The method of claim 16, further comprising determining the second set of slots based on a number of the current BWPs in the first set.

19. The method of claim 16, further comprising determining the second set of slots based on a number of BWP changes the UE is capable of processing in parallel.

20. The method of claim 16, further comprising determining the second set of slots based on a number of the first set of instructions and a slot quantization factor.

21. The method of claim 20, further comprising determining the number of the first set of instructions based on the slot quantization factor.

22. The method of claim 13, further comprising communicating the least one of the first set of signals with the UE via the at least one of the first set of new BWPs in the at least one of a second set of slots scheduled after the delay in response to at least one of the first set of slots being scheduled before the delay.

23. The method of claim 22, further comprising determining the at least one of the second set of slots based on the delay.

24. The method of claim 22, further comprising determining the at least one of the second set of slots based on a number of the current BWPs in the first set.

25. The method of claim 22, further comprising determining the at least one of the second set of slots based on a number of BWP changes the UE is capable of processing in parallel.

26. The method of claim 22, further comprising determining the at least one of the second set of slots based on a number of the first set of instructions and a slot quantization factor.

27. The method of claim 26, further comprising determining the number of the first set of instructions based on the slot quantization factor.

28. The method of claim 13, further comprising:
determining that the UE is to perform a change of a second set of current BWPs to a second set of new BWPs, wherein the second set of current BWPs include the first set of current BWPs and the second set of new BWPs include the first set of new BWPs; and
sending a second set of one or more instructions to the UE to perform a change or a second simultaneous change of a third set of one or more current BWPs to a third set of one or more new BWPs in a second set of one or more cells, wherein the third set of one or more current BWPs include one or more of the second set of current BWPs not in the first set of current BWPs, wherein the third set of one or more new BWPs include one or more of the second set of new BWPs not in the first set of new BWPs, and wherein the second set of one or more instructions schedules a second set of one or more slots for the UE to communicate the first set of signals with the base station via the third set of one or more new BWPs.

29. The method of claim 28, further comprising communicating at least one of the first set of signals with the UE via the at least one of the third set of one or more new BWPs in at least one of a third set of one or more slots scheduled after the delay in response to determining that the UE is not able to communicate the first set of signals with the base station via at least one of the third set of one or more new BWPs based on at least one of the second set of one or more slots being scheduled before the delay.

* * * * *